US012261792B2

(12) United States Patent
Pezeshki et al.

(10) Patent No.: US 12,261,792 B2
(45) Date of Patent: Mar. 25, 2025

(54) GROUP-COMMON REFERENCE SIGNAL FOR OVER-THE-AIR AGGREGATION IN FEDERATED LEARNING

(71) Applicant: QUALCOMM Incorporated, San Diego, CA (US)

(72) Inventors: Hamed Pezeshki, San Diego, CA (US); Tao Luo, San Diego, CA (US); Taesang Yoo, San Diego, CA (US); Mahmoud Taherzadeh Boroujeni, San Diego, CA (US); Eren Balevi, San Diego, CA (US); Srinivas Yerramalli, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/898,180

(22) Filed: Aug. 29, 2022

(65) Prior Publication Data

US 2023/0084883 A1 Mar. 16, 2023

(51) Int. Cl.
*H04L 5/00* (2006.01)
*H04W 24/02* (2009.01)
*H04W 72/12* (2023.01)
*H04W 72/121* (2023.01)

(52) U.S. Cl.
CPC .......... *H04L 5/0048* (2013.01); *H04W 24/02* (2013.01); *H04W 72/121* (2013.01)

(58) Field of Classification Search
CPC .... H04L 5/0048; H04W 24/02; H04W 72/121
USPC ......................................................... 370/329
See application file for complete search history.

(56) References Cited

U.S. PATENT DOCUMENTS

2023/0071767 A1* 3/2023 Zhou ..................... H04W 72/30

* cited by examiner

*Primary Examiner* — Faisal Choudhury
(74) *Attorney, Agent, or Firm* — Procopio, Cory, Hargreaves & Savitch LLP

(57) ABSTRACT

Aspects presented herein may enable a network entity to configure a group of UEs to simultaneously transmit reference signals and to simultaneously transmit gradient vectors to the network entity, such that the network entity may receive the gradient vectors from the group of UEs as an aggregated gradient vector over the air. In one aspect, a base transmits, to a group of UEs, a configuration that configures the group of UEs to simultaneously transmit one or more group-common reference signals and to simultaneously transmit one or more gradient vectors associated with a federated learning procedure. The network entity receives, from the group of UEs, the one or more group-common reference signals and the one or more gradient vectors based on the configuration via multiple channels. The network entity calculates an average gradient vector based on the one or more group-common reference signals and the one or more gradient vectors.

30 Claims, 14 Drawing Sheets

GROUP-COMMON REFERENCE SIGNAL FOR OVER-THE-AIR AGGREGATION IN FEDERATED LEARNING

CROSS REFERENCE TO RELATED APPLICATION(S)

This application claims the benefit of and priority to India Provisional Application Serial No. 202141040005, entitled "GROUP-COMMON REFERENCE SIGNAL FOR OVER-THE-AIR AGGREGATION IN FEDERATED LEARNING" and filed on Sep. 3, 2021, which is expressly incorporated by reference herein in its entirety.

TECHNICAL FIELD

The present disclosure relates generally to communication systems, and more particularly, to wireless communication involving federated learning (FL).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits, to a group of user equipments (UEs), a configuration that configures the group of UEs to simultaneously transmit one or more group-common reference signals and to simultaneously transmit one or more gradient vectors associated with a federated learning procedure. The apparatus receives, from the group of UEs, the one or more group-common reference signals and the one or more gradient vectors based on the configuration via multiple channels. The apparatus calculates an average gradient vector based on the one or more group-common reference signals and the one or more gradient vectors.

In an aspect of the disclosure, a method, a computer-readable medium, and an apparatus are provided. The apparatus receives, from a base station, a configuration that configures a group of UEs to simultaneously transmit one or more group-common reference signals and to simultaneously transmit one or more gradient vectors associated with a federated learning procedure. The apparatus transmits, to the base station, the one or more group-common reference signals and the one or more gradient vectors based on the configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
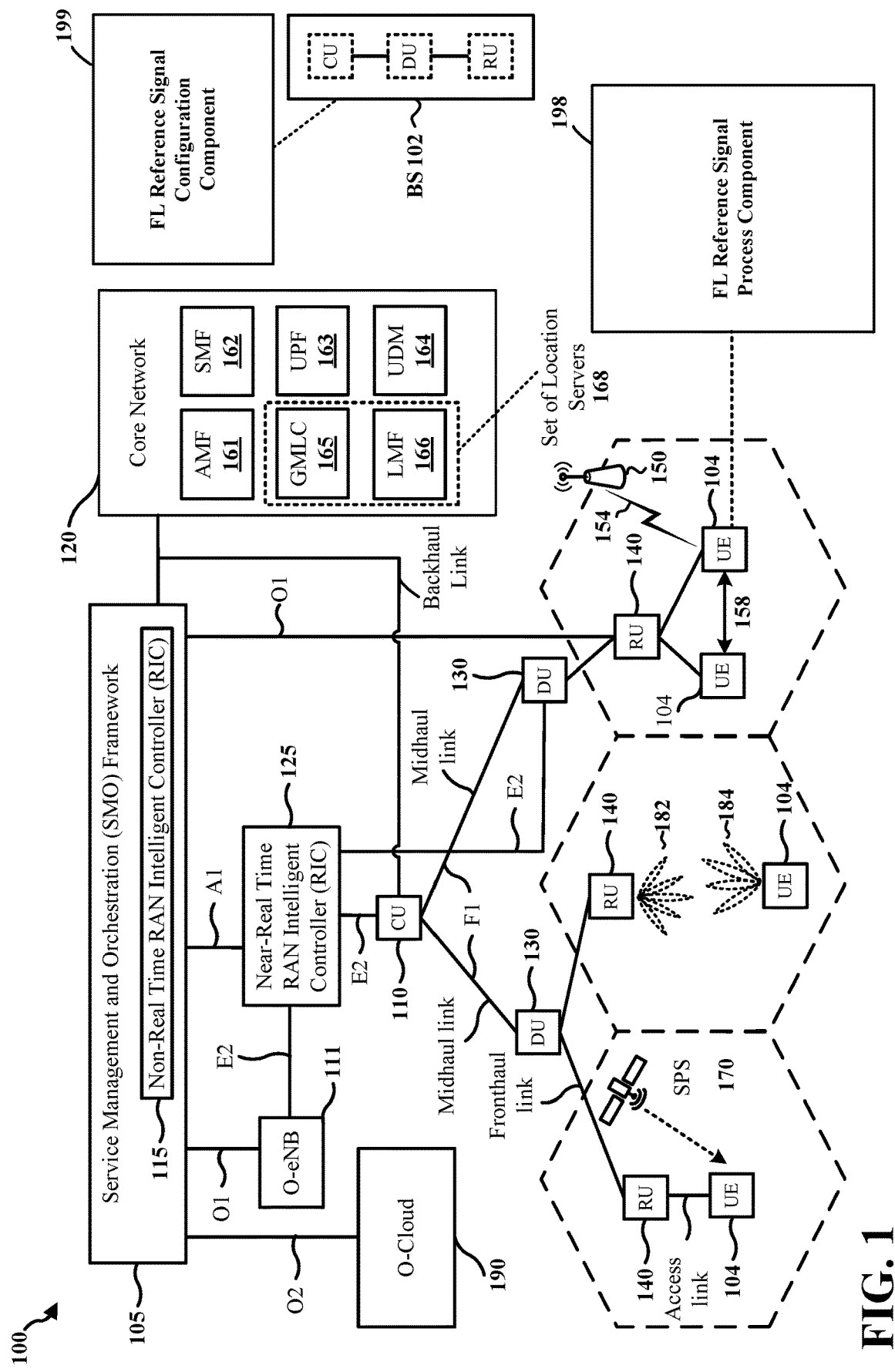
FIG. 1 is a diagram illustrating an example of a wireless communications system and an access network.

Aspects presented herein may improve the performance and efficiency for a federated learning (FL) algorithm. Aspects presented herein may enable a base station to configure a plurality of UEs to transmit their gradient vectors at the same time, such that the gradient vectors from the plurality of UEs may be aggregated over-the-air. Then, the base station may receive the gradient vectors from the plurality of UEs as an aggregated gradient vector instead of multiple individual values, and the base station may calculate an average gradient based on the aggregated gradient vector. As such, aspects presented herein may effectively reduce computation and/or data collection associated with the FL at the base station, which may also reduce communication overhead between the base station and the plurality of UEs as the plurality of UEs may transmit their gradient vectors using same time and frequency resources.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (P Cell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 may include an FL reference signal configuration component 199 that is capable of configuring a group of UEs to simultaneously transmit reference signals and to simultaneously transmit gradient vectors to the base station, such that the base station may receive the gradient vectors from the group of UEs as an aggregated gradient vector over the air. In one configuration, the FL reference signal configuration component 199 may be configured to transmit, to a group of UEs, a configuration that configures the group of UEs to simultaneously transmit one or more group-common reference signals and to simultaneously transmit one or more gradient vectors associated with a federated learning procedure. In such configuration, the FL reference signal configuration component 199 may receive, from the group of UEs, the one or more group-common reference signals and the one or more gradient vectors based on the configuration via multiple channels. In such configuration, the FL reference signal configuration component 199 may calculate an average gradient vector based on the one or more group-common reference signals and the one or more gradient vectors.

In certain aspects, the UE 104 may include an FL reference signal process component 198 configured to transmit reference signal associated with FL simultaneously with other UEs and also to transmit gradient vectors associated with the FL simultaneously with other UEs. In one configuration, the FL reference signal process component 198 may be configured to receive, from a base station, a configuration that configures a group of UEs to simultaneously transmit one or more group-common reference signals and to simultaneously transmit one or more gradient vectors associated with a federated learning procedure. In such configuration, the FL reference signal process component 198 may transmit, to the base station, the one or more group-common reference signals and the one or more gradient vectors based on the configuration.

Figure 2:
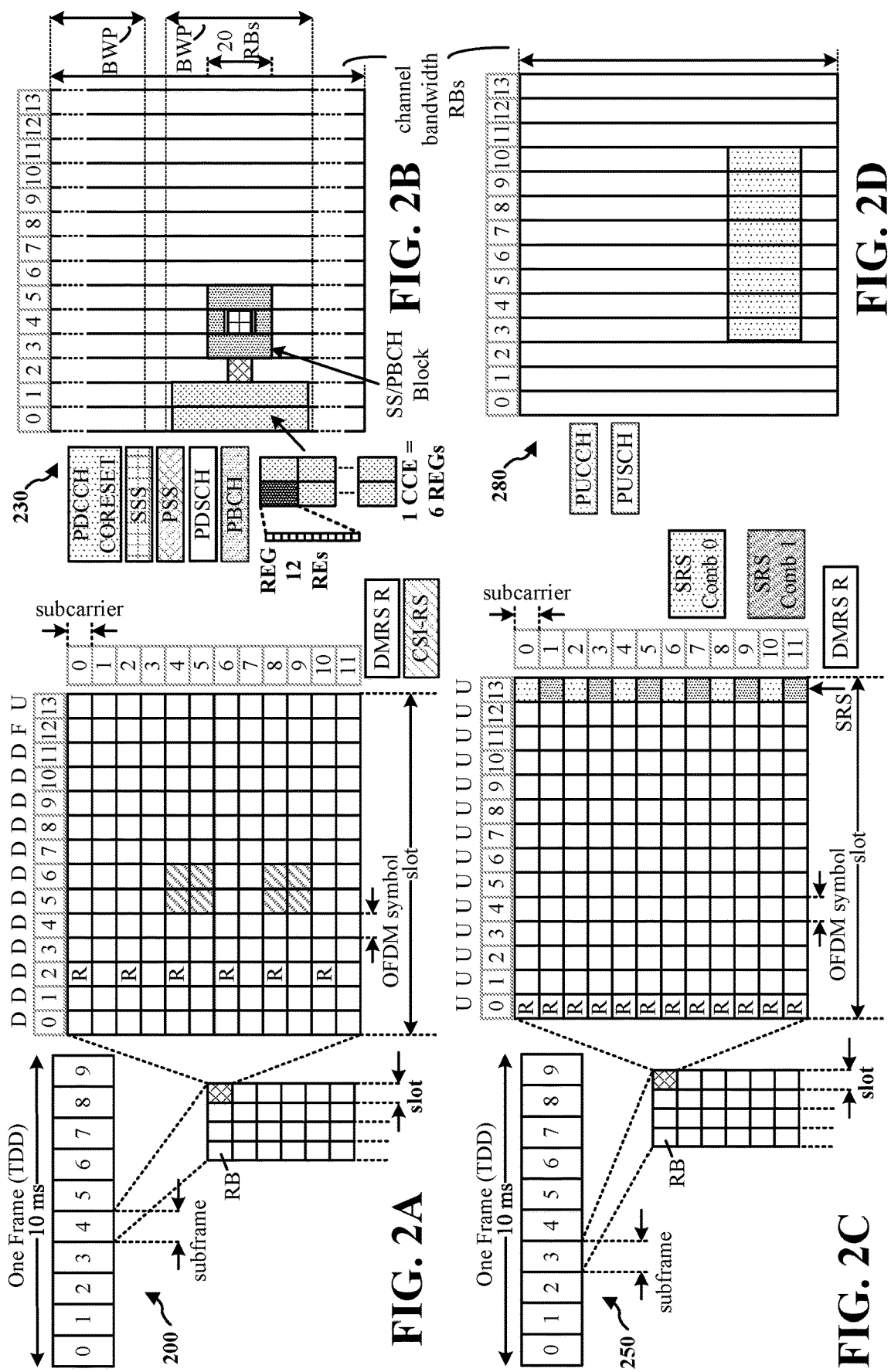
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |

TABLE 1-continued

Numerology, SCS, and CP

| μ | SCS $\Delta f = 2^\mu \cdot 15 [kHz]$ | Cyclic prefix |
|---|---|---|
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
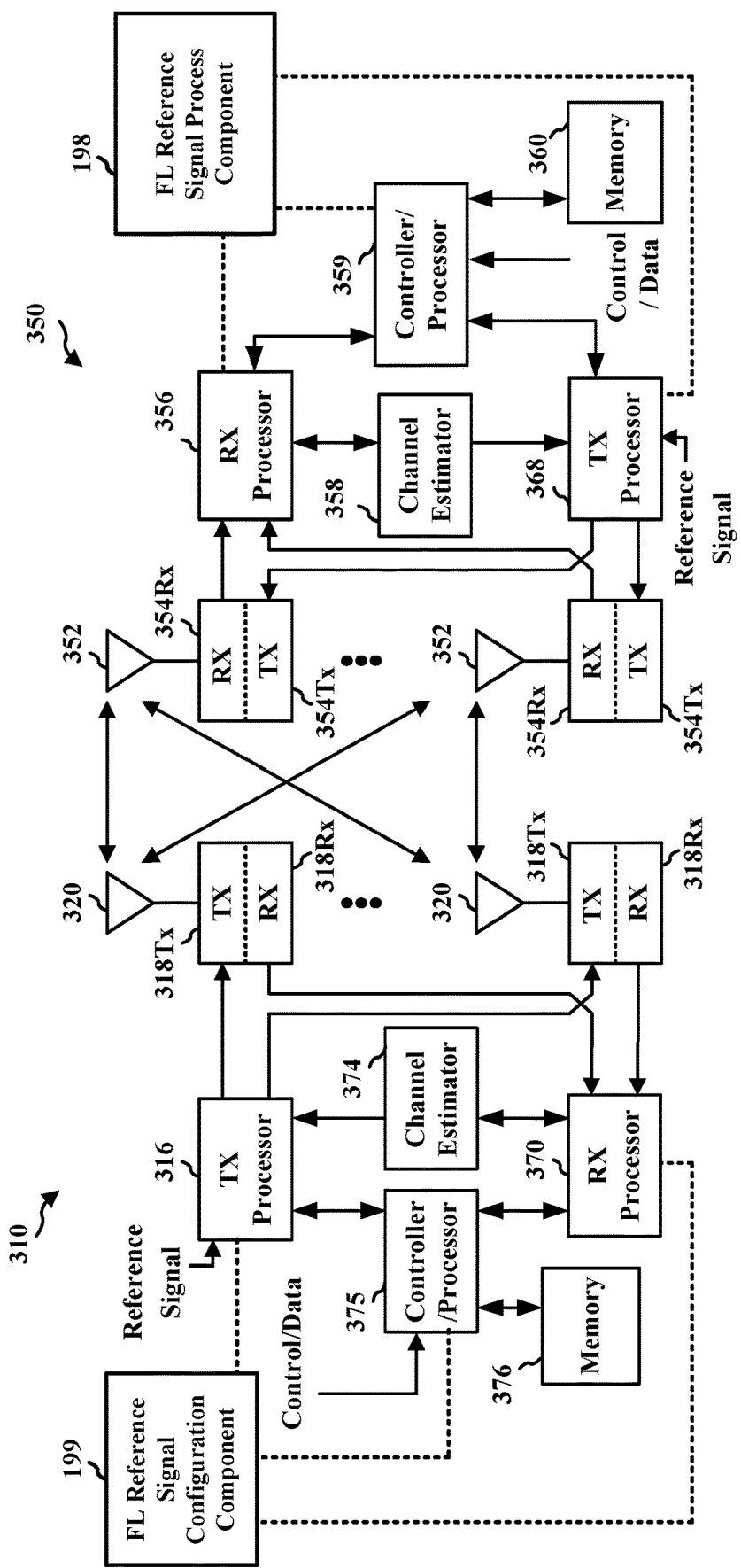
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the FL reference signal process component 198 of FIG. 1.

At least one of the TX processor 316, the RX processor 370, and the controller/processor 375 may be configured to perform aspects in connection with the FL reference signal configuration component 199 of FIG. 1.

A UE and/or a base station may use artificial intelligence (AI) algorithms, machine-learning (ML) algorithms, deep-learning algorithms, neural networks, or advanced signal processing methods, etc., for aspects of wireless communication, e.g., with another UE/base station(s), etc. In one example, AI may be broadly defined as configuring computers/electronics devices to perform tasks regarded as uniquely human. ML may be one category of AI techniques, which may include algorithms that are capable of automatically improving their performance without explicit programming. In some examples, ML algorithms may include supervised learning, unsupervised learning, and/or reinforcement learning (RL). Under the supervised learning, an ML model may specify labelled input and output data during the training phase of the ML. This training data is often labelled by a data scientist in the preparation phase, before being used to train and test the ML model. Once the ML model has learned the relationship between the input and output data, it can be used to classify new and unseen datasets and predict outcomes. Under the unsupervised learning, an ML model may be trained based on raw and unlabeled training data, where the ML model is often used to identify patterns and trends in raw datasets, or to cluster similar data into a specific number of groups. Unsupervised machine learning may be more of a hands-off approach compared to the supervised learning, where the ML model may be configured to process huge arrays of data effectively without human oversight. Under the RL, an ML model may be trained based on rewarding suitable behaviors and/or punishing unsuitable behaviors. For example, positive values may be assigned to the suitable actions to encourage the ML model and negative values may be assigned to unsuitable behaviors. This may enable the ML model to seek a long-term and maximum overall reward to achieve an optimal solution. ML models are often associated with neural networks (NNs), which may also be known as artificial neural networks (ANNs) or simulated neural networks (SNNs). A neuro network may refer to a computer architecture in which a number of processors are interconnected in a manner suggestive of the connections between neurons in a human brain and which is able to learn by a process of trial and error.

In some aspects described herein, an encoding device (e.g., a UE, a base station, or a transmitter, etc.) may train one or more neural networks to learn dependence of measured qualities on individual parameters. Among others, examples of ML models or NNs include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; deep convolutional networks (DCNs) configured with additional pooling and normalization layers; and deep belief networks (DBNs).

A machine learning model, such as an ANN, may include an interconnected group of artificial neurons (e.g., neuron models), which may be a computational device or may represent a method to be performed by a computational device. The connections of the neuron models may be modeled as weights. Machine learning models may provide predictive modeling, adaptive control, and other applications through training via a dataset. The machine learning model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected neural network, a neuron in a first layer may communicate its output to each neuron in a second layer, and each neuron in the second layer may receive input from every neuron in the first layer. In a locally connected neural network, a neuron in a first layer may be connected to a limited number of neurons in the second layer. In some aspects, a convolutional neural network may be locally connected and configured with shared connection strengths associated with the inputs for each neuron in the second layer. A locally connected layer of a neural network may be configured such that each neuron in a layer has the same, or similar, connectivity pattern, but with different connection strengths.

A machine learning model or an NN may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level. For purposes of the present disclosure, an "inference" or an "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode. On the other hand, a "training" or an "ML training" may refer to a process of running data points to train or teach an ML model (e.g., via a training host). A "training host" or an "ML training host" may refer to a network function which hosts the ML model during a training mode.

The machine learning models may include computational complexity and substantial processor for training the machine learning models. A communication system may be associated or implemented with an NN, which may also be referred to as an artificial neural network learning algorithm. A neural network may include a computational learning system, which may be implemented at a UE and/or at a base station, that uses one or more algorithms/functions to interpret and translate an input data into a target output data. For example, if an input data includes a color green, a goal of a neural network may be to identify the input data as the color green at an output through training and machine learning. In one example, a neural network may learn or may be trained by processing examples, where each example may include an input and a result which may form probability-weighted associations between the input and the result. For example, the training of a neural network may involve determining the difference between a processed output of the network and a target output (e.g., between the color blue and the color green). Then, the neural network may adjust its weighted associations according to a learning rule (e.g., the color blue is given less weight and the color green is given more weight for same or similar input data (e.g., green)). After successive adjustments, the neural network may produce output which is increasingly similar to the target output. Then, after the neural network performs a sufficient number of adjustments, the training may be terminated, such as when the neural network may identify/translate an input data to a target output with an accuracy above a threshold.

In some scenarios, for a device, such as a base station, to apply a machine learning algorithm to learn or to train the weights for one or more parameters, the device may specify input data (e.g., raw data) to be collected from other devices (e.g., from multiple UEs), which may be referred to as a "centralized machine learning."

Figure 4:
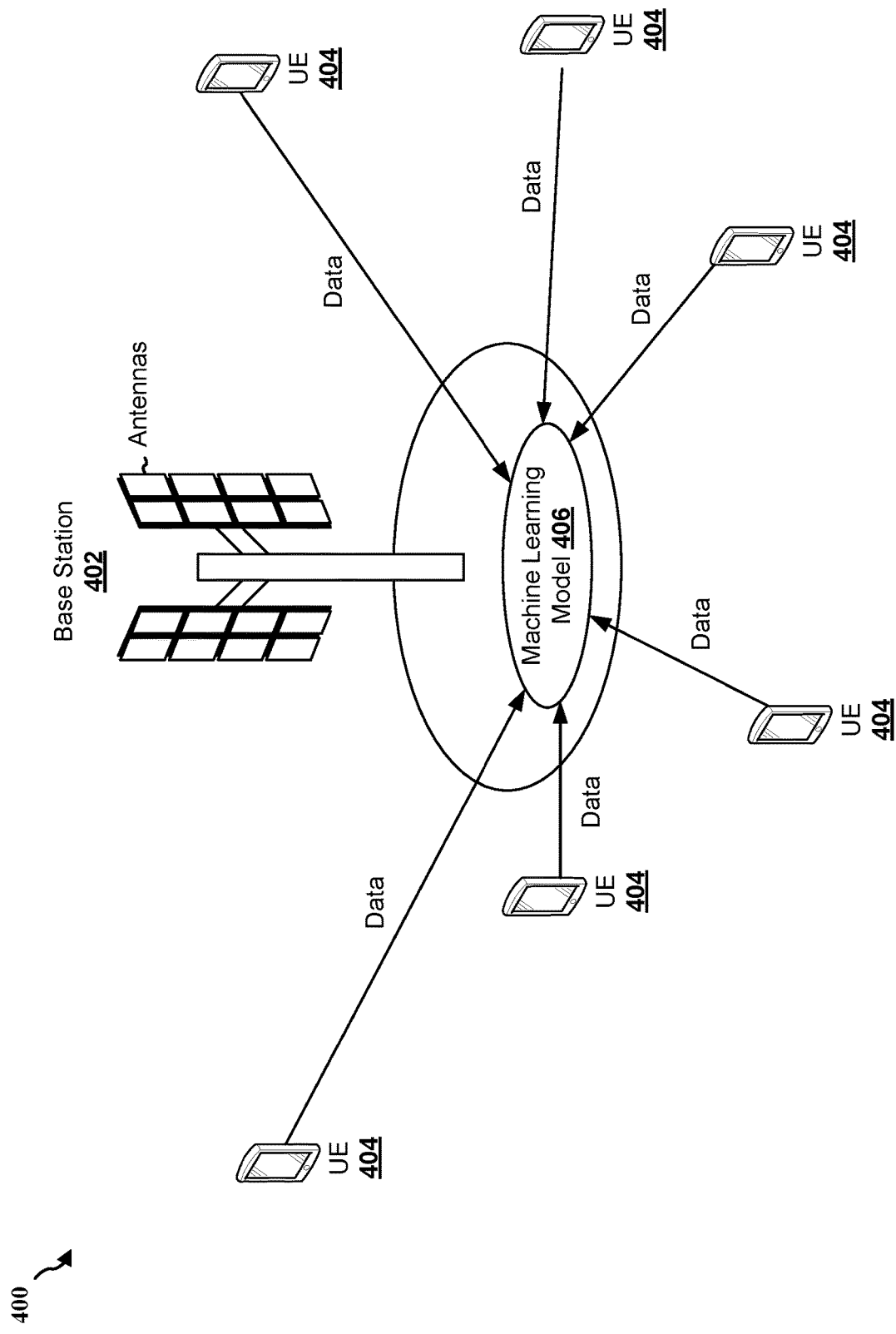
FIG. 4 is a diagram illustrating an example of a base station applying a centralized machine learning algorithm in accordance with aspects.

FIG. 4 is a diagram 400 illustrating an example of a base station applying a centralized machine learning algorithm in accordance with various aspects of the present disclosure. In one example, a base station 402 may be configured to apply a machine learning model 406 that is associated with "next word prediction," which may be an input technology that simplifies the process of typing by suggesting the next word to a user to select. To apply the machine learning model 406, the base station 402 may request multiple UEs 404 to transmit their users' text messages or emails to the base station 402, such that the base station 402 may learn (e.g., through statistics) which word(s) are more likely to show up after a specific word. For example, if the base station 402 is configured to learn what word(s) are most likely to show up after the word "happy," the base station 402 may request multiple UEs 404 to transmit phrases, text messages, emails, word documents, etc., (collectively as "data") that include the word "happy" to the base station. Based on analyzing the data received from the multiple UEs 404, the base station may learn word(s) that are likely to show after the word "happy." For example, the base station 402 may determine that the word "birthday" has 33% of showing up after the word "happy," the word "Friday" has 26% of showing up after the word "happy," and the word "holiday" has 10% of showing up after the word "happy," etc. Based on the result, the base station 402 may transmit the learned parameter(s) to the multiple UEs 404 (e.g., update the learning model for the multiple UEs 404), such that if users of the multiple UEs 404 type the word "happy," the word "birthday," "Friday," and/or "holiday" may be suggested to the user as the next word.

In some examples, a centralized machine learning model (e.g., a machine learning model that collects data to be analyzed from multiple devices) may have various drawbacks. For example, in regions where there are enhanced privacy and/or security regulations/laws related to collection and usage of data, a base station may not be able to collect raw data from other devices (unless certain protocols are followed). In another example, the raw data may be large in size. Thus, if multiple devices are transmitting raw data to a base station, it may consume a large amount of bandwidth. In addition, as an amount of data increases, it may take a longer time for the base station to process the data.

To overcome the potential drawbacks of the centralized machine learning, a device (e.g., a base station) may apply a federated learning (FL) algorithm for the machine learning model as an alternative, which may also be referred to as "decentralized machine learning" and/or "collaborative learning." FL is a machine learning technique that trains an algorithm across multiple decentralized devices or servers with local data samples without exchanging them. FL may enable multiple entities (e.g., devices) to build a common, robust machine learning model without sharing data with each other, thus allowing the multiple entities to comply with data privacy, data security, and/or data access rights while performing machine learning. In other words, instead of collecting data to be analyzed from multiple devices/servers and analyze the data in a central server, FL may enable data to be analyzed at each edge device/server. Then, each edge device/server may transmit its analyzed data (e.g., the trained weights) to the central server (or to each other without transmitting to a central server), and the central server may process the analyzed data received from the multiple edge devices/servers for the machine learning.

For example, referring back to FIG. 4, under FL, each of the multiple UEs 404 may be configured to apply the "next word prediction" machine learning model, where each of the multiple UEs 404 may be configured to learn which word(s) are more likely to show up after a specific word. For example, to learn what word(s) are most likely to show up after the word "happy," a UE within the multiple UEs 404 may analyze phrases, text messages, emails, word documents, etc., that include the word "happy" in the UE (e.g., typed by the user of the UE). Then, each of the multiple UEs 404 may transmit its analysis to the base station 402. For example, the base station 402 may receive from 40% of UEs indicating that the word "birthday" is a most often used word following the word "happy," the base station 402 may receive from 25% of UEs indicating that the word "Friday" is a most often used word following the word "happy," and the base station 402 may also receive from 15% of UEs indicating that the word "holiday" is a most often used word following the word "happy," etc. Thus, based on the analysis received from the multiple UEs 404, the base station 402 may determine that the word "birthday," "Friday," and "holiday" are likely to show up after the word "happy." Based on the determination, the base station 402 may transmit the learned parameter(s) to the multiple UEs 404 (e.g., update the learning model for the multiple UEs 404), such that if users of the multiple UEs 404 type the word "happy," the word "birthday," "Friday," and/or "holiday" may be suggested to the user as the next word. As such, FL may enable a machine learning model to be applied to multiple devices without specifying the multiple devices to share their local data (e.g., raw data) with each other. In addition, as analysis result from each device/server may be much smaller in size compared to raw data, the transmission overhead from each device/server may be greatly reduced, which also reduces the processing time for the base station/central server.

Figure 5:
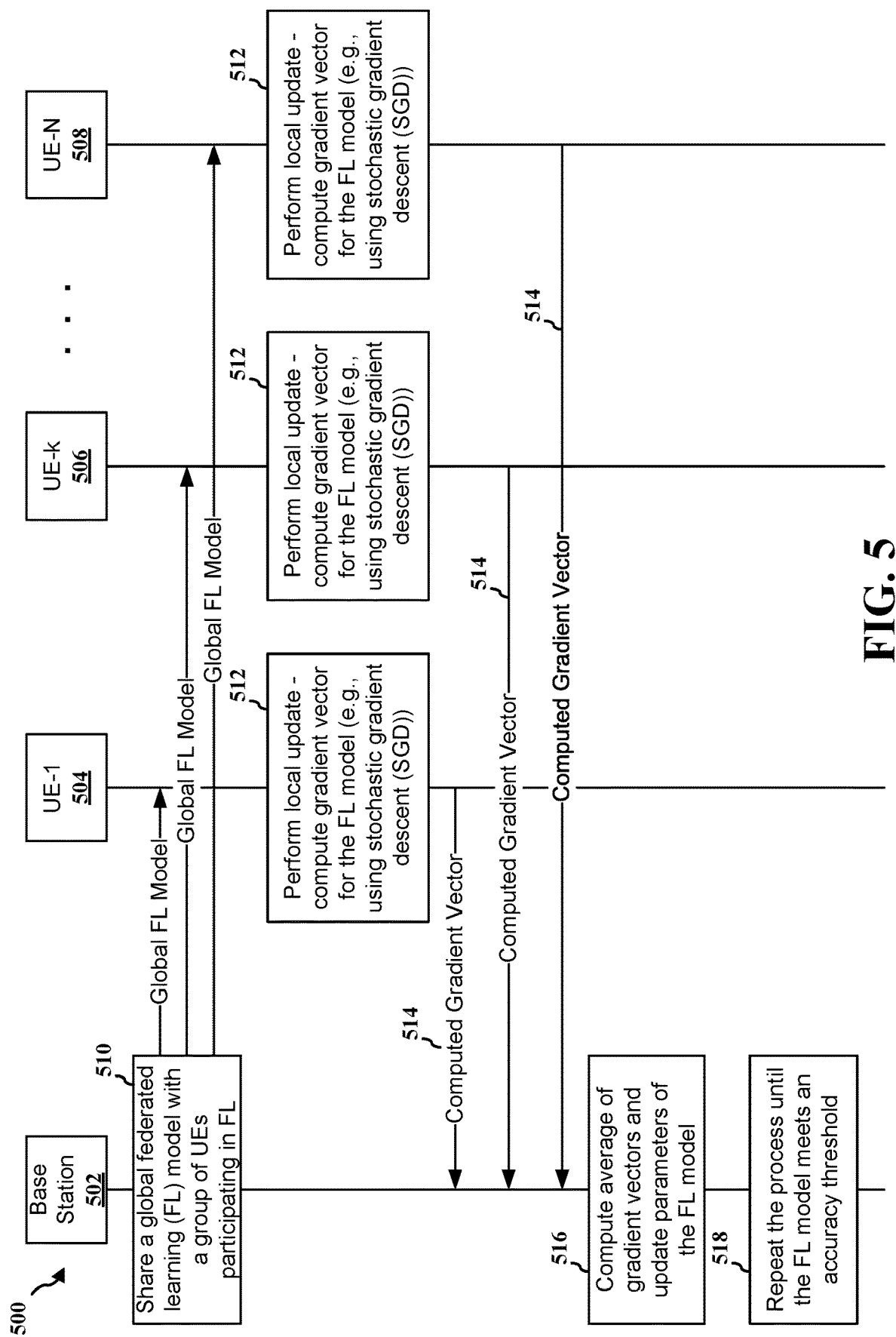
FIG. 5 is a communication flow illustrating an example sequence of events for an FL algorithm in accordance with various aspects of the present disclosure.

FIG. 5 is a communication flow 500 illustrating an example sequence of events for an FL algorithm in accordance with various aspects of the present disclosure. The numberings associated with the communication flow 500 do not specify a particular temporal order and are merely used as references for the communication flow 500.

At 510, a base station 502 may communicate with a plurality of UEs that are participants of an FL procedure, which may include a first UE 504, a second UE 506, and up to $N^{th}$ UE 508, etc., and the base station 502 may share a global FL model with the plurality of UEs. In one example, the FL model parameter(s) to be optimized may be denoted by $w^{(n)}$, and the initial FL parameter(s) may be denoted by $w^{(0)}$, where n may be an FL round index (e.g., a number of times the FL is performed).

At 512, after receiving the global FL model, each of the plurality of UEs may perform a local update for the global FL model. For example, each of the plurality of UEs may compute one or more gradient vectors associated with the FL model (e.g., finding word(s) that follows a specific word as described in connection with FIG. 4), where the gradient vectors for a UE k may be denoted by $g_k^{(n)}$ (or their compressed values $\tilde{g}_k^{(n)}$. In some examples, the UE may compute the gradient vector based on using stochastic gradient descent (SGD). SGD may be an iterative method for optimizing an objective function with suitable smoothness properties (e.g., differentiable or subdifferentiable). SGD may be regarded as a stochastic approximation of gradient descent optimization, as SGD may replace an actual gradient (calculated from the entire data set) by an estimate thereof (calculated from a randomly selected subset of the data). Each UE may either go through a single SGD step or multiple SGD steps. Gradient descent may provide an efficient optimization algorithm that attempts to find a local or global minimum of a cost function. A local minimum may refer to a point where a function is lower than neighboring points, and a global minimum may refer to a point that obtains the absolute lowest value of the function.

At 514, after the plurality of UEs (e.g., the first UE 504, the second UE 506, and the $N^{th}$ UE 508, etc.) complete the local update, the plurality of UEs may feed back the computed gradient vectors (e.g., gradient vectors $g_k^{(n)}$ or compressed gradient vectors $\tilde{g}_k^{(n)}$, etc.) to the base station 502. For purposes of illustrating, a local dataset size at a UE k may be denoted by $D_k$. For example, the local dataset for the first UE 504 may be denoted by $D_1$, the local dataset for the second UE 506 may be denoted by $D_2$, and the local dataset for the $N^{th}$ UE 504 may be denoted by $D_N$, etc.

At 516, after the base station 502 receives the computed gradient vectors (e.g., $g_k^{(n)}$ or $\tilde{g}_k^{(n)}$) from the plurality of UEs, the base station 502 may compute an average for the received gradient vectors, and the base station 502 may update the global FL model based on the computed average.

At 518, the base station 502 may repeat the processes described in connection with 510, 512, 514, and/or 516 for multiple times until the global FL model meets an accuracy threshold (e.g., until a global FL accuracy specification is met or until the global FL algorithm converges, etc.). In some examples, for a UE k, a local loss function associated with the FL model may be based on $$F_k(w) = \frac{1}{|D_k|} \sum_{(x_j, y_j) \in D_k} f(w, x_j, y_j),$$

and a global loss function (assuming $|D_k|=D$) may be based on $$F(w) = \frac{\sum_{k=1}^{K} \sum_{j \in D_k} f_j(w)}{K.D} = \frac{1}{K} \sum_{k=1}^{K} F_k(w).$$

Thus, a goal of the FL process is to minimize the global loss function (e.g., $w^*=\text{argmin } F(w)$).

Aspects presented herein may improve the performance and efficiency for an FL algorithm. Aspects presented herein may enabling a base station to configure a plurality of UEs to transmit their gradient vectors (e.g., $g_k^{(n)}$ or $\tilde{g}_k^{(n)}$) at a same time, such that the gradient vectors from the plurality of UEs may be aggregated over-the-air (OTA). Then, the base station may receive gradient vectors from the plurality of UEs as an aggregated gradient vector instead of receiving multiple gradient vectors from different UEs (which may also be received at different times), and the base station may calculate an average gradient based on the aggregated gradient vector (e.g., by dividing the aggregated gradient vector with a number of UEs transmitting the gradient vectors). As such, aspects presented herein may effectively reduce computation and/or data collection associated with the FL at the base station, which may also reduce communication overhead between the base station and the plurality of UEs (e.g., the plurality of UEs may simultaneously transmit gradient vectors using same time and frequency resources).

Figure 6:
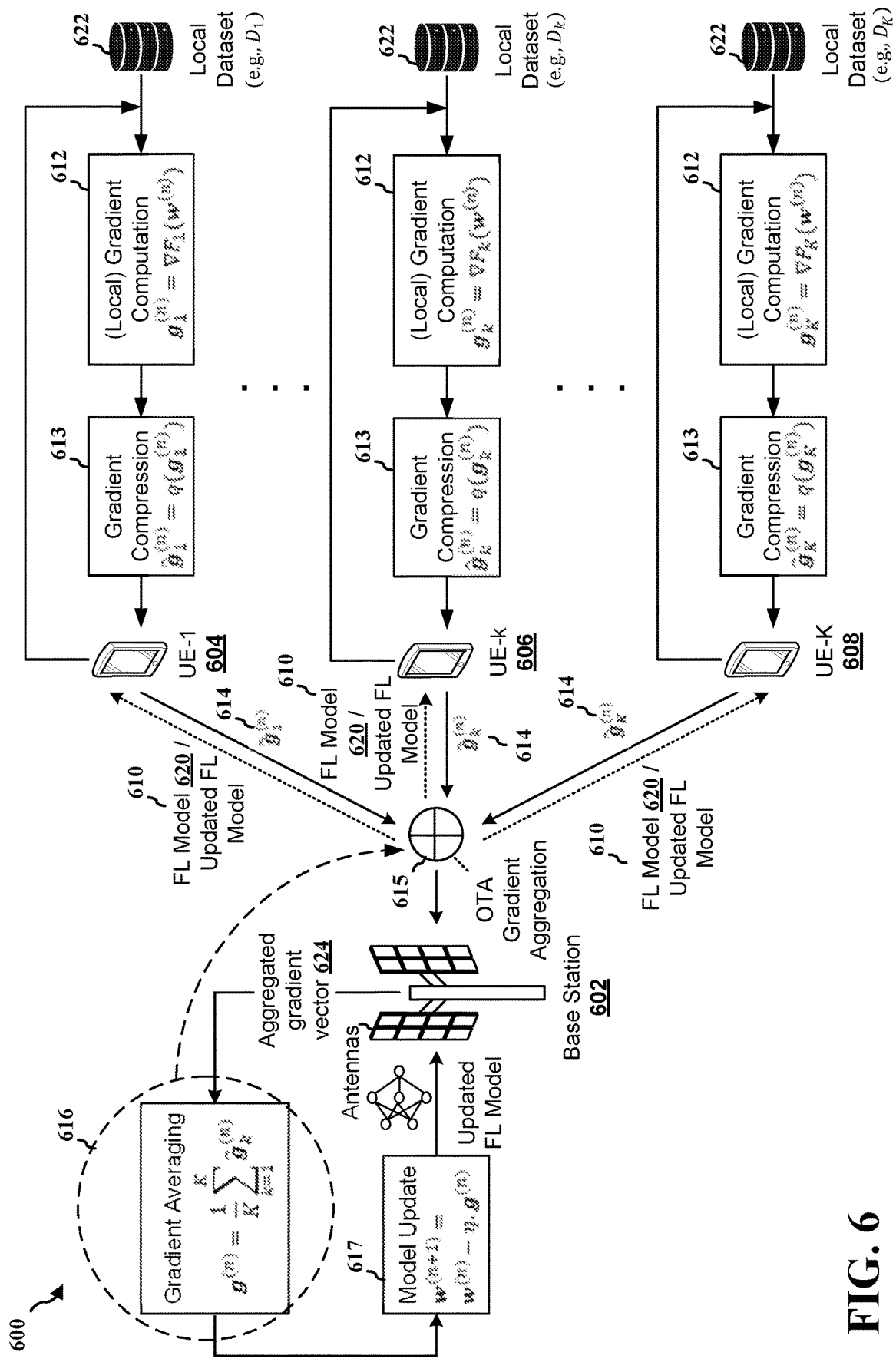
FIG. 6 is a diagram illustrating an example FL model with an over-the-air (OTA) gradient aggregation (e.g., based on analog transmissions) in accordance with various aspects of the present disclosure.

FIG. 6 is a diagram 600 illustrating an example FL model with an OTA gradient aggregation (e.g., based on analog transmissions) in accordance with various aspects of the present disclosure. Aspects presented herein may enable a base station to receive gradient vectors from a plurality of UEs based on an aggregated gradient vector.

As shown at 610, a base station 602 may communicate with a plurality of UEs that are participants of an FL procedure, which may include a first UE 604, a $k^{th}$ UE 606, and up to $K^{th}$ UE 608, etc., and the base station 602 may share a global FL model 620 with the plurality of UEs, such as described in connection with 510 of FIG. 5. In one example, one or more FL model parameter(s) to be optimized (e.g., to be trained) may be denoted by $w^{(n)}$, and the initial FL parameter(s) may be denoted by $w^{(0)}$, where n may be an FL round index (e.g., a number of times the FL is performed).

As shown at 612, after receiving the global FL model 620, each of the plurality of UEs may perform a local update for the global FL model 620, such as described in connection with 512 of FIG. 5. For example, the $k^{th}$ UE 606 may compute one or more gradient vectors associated with the FL model based on $g_k^{(n)}=\nabla F_k(w^{(n)})$, where $g_k^{(n)}$ may be the gradient vectors. In some examples, the UE may compute the gradient vector based on SGD or other similar means. In other examples, as shown at 613, the plurality of UEs may additionally perform gradient compression for the computed gradient based on $\tilde{g}_k^{(n)}=q(g_k^{(n)})$.

As shown at 614, after the plurality of UEs (e.g., the first UE 604, the $k^{th}$ UE 606, and the $K^{th}$ UE 608, etc.) complete the local update, the plurality of UEs may feed back the gradient vectors $g_k^{(n)}$ or the compressed gradient vectors $\tilde{g}_k^{(n)}$ to the base station 602, such as described in connection with 514 of FIG. 5. In some examples, a size for a local dataset 622 at a UE N may be denoted by $D_N$. For example, the local dataset 622 for the first UE 604 may be denoted by $D_1$, the local dataset 622 for the $k^{th}$ UE 606 may be denoted by $D_k$, and the local dataset 622 for the $K^{th}$ UE 608 may be denoted by $D_K$, etc.

In one aspect of the present disclosure, as shown at 615, the base station 602 may configure the plurality of UEs to simultaneously transmit their gradient vectors $g_k^{(n)}$ or the compressed gradient vectors $\tilde{g}_k^{(n)}$ to the base station 602 over the air (e.g., via analog transmissions), such that the gradient vectors $g_k^{(n)}$ or the compressed gradient vectors $\tilde{g}_k^{(n)}$ from the plurality of UEs may be aggregated over the air (e.g., based on the superposition property associated with wireless transmission). Thus, the base station 602 may simultaneously receive gradient vectors from the plurality of UEs as an aggregated gradient vector 624 (e.g., instead of multiple individual gradient vectors).

As shown at 616, after the base station 602 receives the aggregated gradient vectors 624 from the plurality of UEs, the base station 602 may compute an average gradient vector based on the aggregated gradient vector 624 by dividing the aggregated gradient vector 624 with a number of UEs within the plurality of UEs (e.g., by a number of UEs that transmitted the gradient vectors). For example, the base station 602 may calculate the average gradient based on $$g^{(n)} = \frac{1}{K} \sum_{k=1}^{K} \tilde{g}_k^{(n)},$$

where $\sum_{k=1}^{K} \tilde{g}_k^{(n)}$ may be the aggregated gradient vector 624 obtained at 615.

Then, as shown at 617, the base station 602 may update the global FL model 620 based on the computed average gradient vector. For example, the base station 602 may update the FL model 620 based on $w^{(n+1)}=w^{(n)}-\eta \cdot g^{(n)}$, such as described in connection with 516 of FIG. 5.

After the FL model 620 is updated, the base station 602 may transmit the updated FL model to the plurality of UEs, such as shown at 610, and the base station 602 and the plurality of UEs may repeat the processes described in connection with 610, 612, 613, 614, 615, 616, and/or 617 for multiple times until the global FL model 620 meets an accuracy threshold (e.g., until the global FL model 620 converges). In some examples, a local loss function associated with the FL model may be based on $$F_k(w) = \frac{1}{|D_k|} \sum_{(x_j, y_j) \in D_k} f(w, x_j, y_j),$$

and a global loss function (assuming $|D_k|=D$) may be based on $$F(w) = \frac{\sum_{k=1}^{K} \sum_{j \in D_k} f_j(w)}{K.D} = \frac{1}{K} \sum_{k=1}^{K} F_k(w).$$

Thus, a goal of the FL process is to minimize the global loss function (e.g., $w^*=\text{argmin } F(w)$).

In other words, for a base station to calculate/compute an average gradient value for local gradient updates (e.g., $g_k^{(n)}$ or $\tilde{g}_k^{(n)}$) across a plurality of UEs for an FL model, aspects discussed in connection with FIG. 6 may enable the base station to leverage the superposition property of the wireless multiple access channels to aggregate the local gradients associated with the FL model over the air (as opposed to receive individual values from the plurality of UEs and aggregate the values at the base station). For purposes of the present disclosure, aggregating gradient vectors transmitted from multiple devices (e.g., UEs) over the air may also be referred to as an OTA gradient aggregation.

The OTA gradient aggregation may be a resource-efficient mechanism for implementing FL for a group of UEs, where the group of UEs may transmit their gradient vectors using same frequency and time resources. The OTA approach for gradient aggregation may be motivated by the fact that a base station may use the sum (or the average) of the gradient vectors for the FL model update, and the base station may perform this without knowing individual gradient vectors from different UEs.

Figure 7:
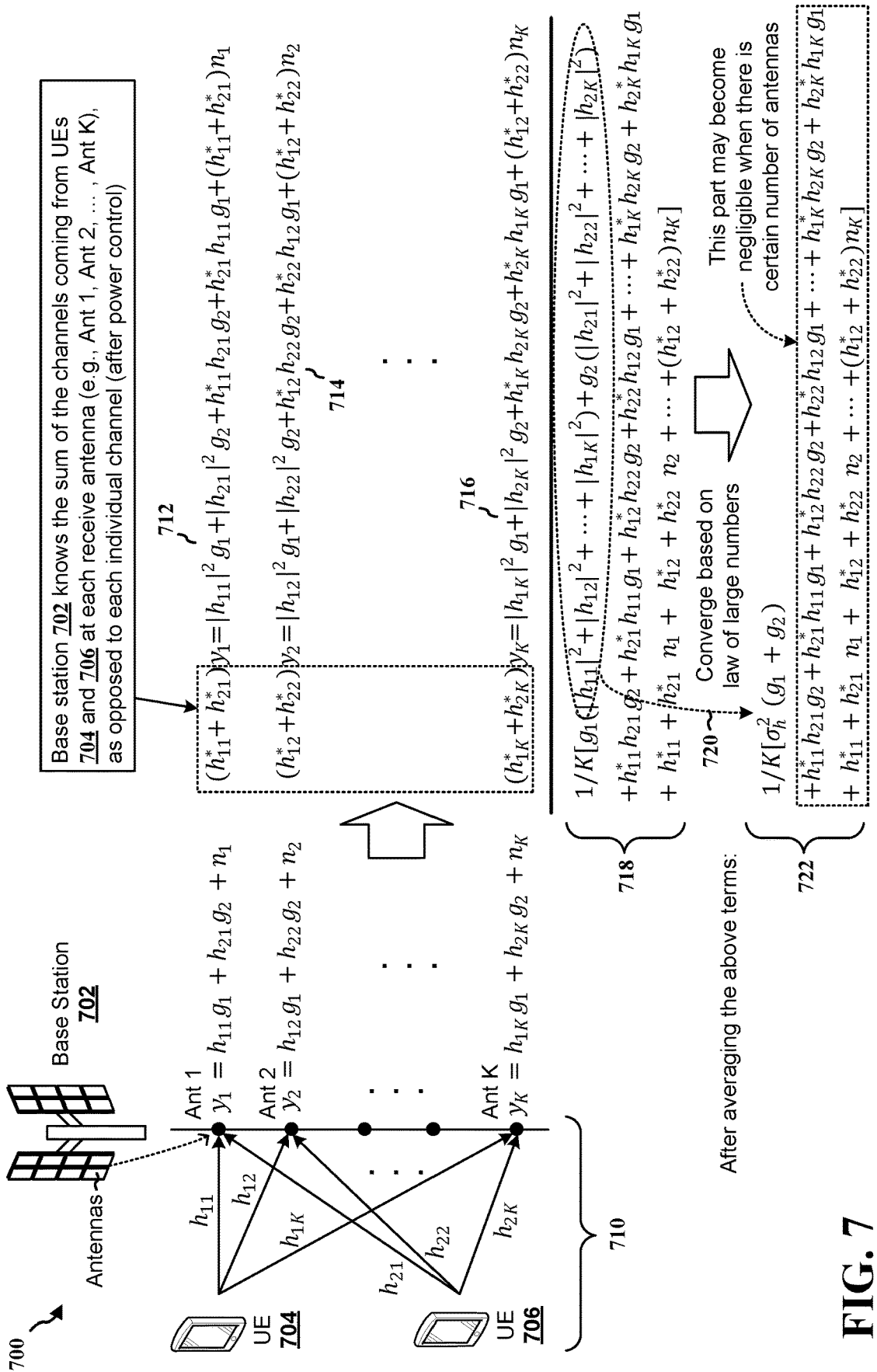
FIG. 7 is a diagram illustrating an example OTA gradient aggregation for a multiple-antenna receiver (e.g., a base station) in accordance with various aspects of the present disclosure.

FIG. 7 is a diagram 700 illustrating an example OTA gradient aggregation for a multiple-antenna receiver (e.g., a base station) in accordance with various aspects of the present disclosure. In one example, an OTA aggregation may apply to a massive multiple input multiple output (MIMO) context.

As shown at 710, a base station 702 with K antennas (e.g., Ant 1, Ant 2, . . . , Ant K, etc.) may simultaneously receive a first gradient vector transmitted from a first UE 704 (which may be a single antenna UE) and a second gradient vector transmitted from a second UE 706 (which may be a single antenna UE) at each of the K antennas. In other words, the first UE 704 and the second UE 706 may be configured to transmit their gradient vectors simultaneously to the base station 702, which may be received by the base station 702 via multiple antennas of the base station 702.

In one example, a received signal y at an antenna x of the base station 702 may be denoted by $y_x=h_{1x}g_1+h_{2x}g_2+n_x$, where $h_{1x}$ may indicate a channel between the first UE 704 and the antenna x, $g_1$ may indicate the gradient vector transmitted by the first UE 704, $h_{2x}$ may indicate the channel between the second UE 706 and the antenna x, $g_2$ may indicate the gradient vector transmitted by the second UE 706, and $n_x$ may indicate the noise at the antenna x. In some examples, h may be complex, where a channel may be modeled as a (complex) random variable. Thus, if h is complex Gaussian, then the magnitude of h may have a Rayleigh distribution. In one example, a received signal at a first antenna (e.g., Ant 1) of the base station 702 may be denoted by $y_1=h_{11}g_1+h_{21}g_2+n_1$, where $y_1$ may indicate the received signal, $h_{11}g_1$ may indicate a channel between the first UE 704 and the first antenna ($h_{11}$) multiplied by the gradient vector ($g_1$) transmitted from the first UE 704, $h_{21}g_2$ may indicate a channel between the second UE 706 and the first antenna ($h_{21}$) multiplied by the gradient vector ($g_2$) transmitted from the second UE 706, and $n_1$ may be a measured noise at the first antenna. Similarly, a received signal at a $K^{th}$ antenna (e.g., Ant K) of the base station 702 may be denoted by $y_K=h_{1K}g_1+h_{2K}g_2+n_K$, where $y_K$ may indicate the received signal, $h_{1K}g_1$ may indicate a channel between the first UE 704 and the $K^{th}$ antenna ($h_{1K}$) multiplied by the gradient vector ($g_1$) transmitted from the first UE 704, $h_{2K}g_2$ may indicate a channel between the second UE 706 and the $K^{th}$ antenna ($h_{2K}$) multiplied by the gradient vector ($g_2$) transmitted from the second UE 706, and $n_K$ may be a measured noise at the $K^{th}$ antenna, etc.

As it may not be important for the base station 702 to know the values for each individual gradient vector transmitted from the first UE 704 (e.g., $g_1$) and the second UE 706 (e.g., $g_2$) in order for the base station 702 to calculate an average gradient vector, if the base station 702 knows the sum of the channels at each antenna, the base station 702 may be able to derive the sum of the gradient vectors based at least in part on the sum of the channels at each antenna (e.g., by averaging out the fading associated with the channels). For example, for the base station 702 to obtain the value of gradient vector transmitted by the first UE 704, the base station 702 may be specified to know the specific channel condition between the first UE 704 and an antenna of the base station 702, such that the base station 702 may be able to obtain the gradient vector based on the channel condition. However, as the base station 702 may compute the average gradient vector based on the total value of the gradient vectors, the base station 702 may skip obtaining the gradient vector from each individual UEs, which may greatly reduce communication overhead and computational load at the base station.

As an illustration, a received signal at a first antenna (e.g., Ant 1) of the base station 702 may be denoted by $y_1=h_{11}g_1+h_{21}g_2+n_1$. If the base station 702 knows the sum of the channels at the first antenna (e.g., the sum of $h_{11}$ and $h_{21}$), the base station 702 may be able to correlate the sum of the channels at the first antenna with the received signal and the sum of the gradient vectors (e.g., the sum of $g_1$ and $g_2$). For example, as shown at 712, if the sum of the channels $h_{11}$ and $h_{21}$ at the first antenna is known, the sum of the channels may be correlated with the received signal at the first antenna (e.g., $y_1$), where the correlation may be represented by a first term $(h_{11}{}^*+h_{21}{}^*)y_1=|h_{11}|^2g_1+|h_{21}|^2g_2+h_{11}{}^*h_{21}g_2+h_{21}{}^*h_{11}g_1+(h_{11}{}^*+h_{21}{}^*)n_1$. Similarly, as shown at 714, if the sum of the channels $h_{12}$ and $h_{22}$ at a second antenna (e.g., Ant 2) is known, the sum of the channels may be correlated with the received signal at the second antenna (e.g., $y_2$), where the correlation may be represented by a second term $(h_{11}{}^*+h_{21}{}^*)y_1=|h_{11}|^2g_1+|h_{21}|^2g_2+h_{11}{}^*h_{21}g_2+h_{21}{}^*h_{11}g_1+(h_{11}{}^*+h_{21}{}^*)n_1$. As shown at 716, if the sum of the channels $h_{1K}$ and $h_{2K}$ at the $K^{th}$ antenna (e.g., Ant K) is known, the sum of the channels may be correlated with the received signal at the $K^{th}$ antenna (e.g., $y_K$), where the correlation may be represented by a $K^{th}$ term $(h_{1K}{}^*+h_{2K}{}^*)y_K=|h_{1K}|^2g_1+|h_{2K}|^2g_2+h_{1K}{}^*h_{2K}g_2+h_{2K}{}^*h_{1K}g_1+(h_{12}{}^*+h_{22}{}^*)n_K$, etc.

Then, as shown at 718, the base station 702 may calculate an average value for all the terms (e.g., the first term, the second term, and up to the $K^{th}$ term, etc.). For example, the base station 702 may add $(h_{11}{}^*+h_{21}{}^*)y_1$ to $(h_{12}{}^*+h_{22}{}^*)y_2$ . . . and up to $(h_{1K}{}^*+h_{2K}{}^*)y_2$ to obtain a total value for all the terms (e.g., for K antennas), then the base station 702 may obtain an average value by dividing the total value over K. As such, the average value may be denoted by the term: $1/K[g_1(|h_{11}|^2+|h_{12}|^2+ \ldots +|h_{1K}|^2)+g_2(|h_{21}|^2+|h_{22}|^2+ \ldots +|h_{2K}|^2)+h_{11}{}^*h_{21}g_2+h_{21}{}^*h_{11}g_1+h_{12}{}^*h_{22}g_2+h_{22}{}^*h_{12}g_1+ \ldots +h_{1K}{}^*h_{2K}g_2+h_{2K}{}^*h_{1K}g_1+(h_{11}{}^*+h_{21}{}^*)n_1+(h_{12}{}^*+h_{22}{}^*)n_2+ \ldots +(h_{12}{}^*h_{22}{}^*)n_K]$.

Based on the law of large numbers, if a number of samples increases, its mean may become closer to an average of the whole population. As shown at 720, if the law of large numbers is applied to the term at 718, the term at 718 may be converged to: $1/K[\sigma_h{}^2(g_1+g_2)+h_{11}{}^*h_{21}g_2+h_{21}{}^*h_{11}g_1+g_{12}{}^*h_{22}g_2+h_{22}{}^*h_{12}g_1+ \ldots +h_{1K}{}^*h_{2K}g_2+h_{2K}{}^*h_{1K}g_1+(h_{11}{}^*+h_{21}{}^*)n_1+(h_{12}{}^*+h_{22}{}^*)n_2+ \ldots ++(h_{12}{}^*+h_{22}{}^*)n_K]$, where $\sigma_h$ may indicate a sum of the channels or channel powers, such as shown at 722. In some examples, when there is a certain number of antennas (e.g., a large number of antennas), the $h_{11}{}^*h_{21}g_2+h_{21}{}^*h_{11}g_1+h_{12}{}^*h_{22}g_2+h_{22}{}^*h_{12}g_1+ \ldots +h_{1K}{}^*h_{2K}g_2+h_{2K}{}^*h_{1K}g_1+(h_{11}{}^*+h_{21}{}^*)n_1+(h_{12}{}^*+h_{22}{}^*)n_2+ \ldots ++(h_{12}+h_{22}{}^*)n_K$ portion of the term may become negligible, such that the term may become $1/K[\sigma_h{}^2(g_1+g_2)]$. Accordingly, the base station 702 may be able to obtain the sum of the gradient vectors ($g_1+g_2$) and/or the average of the gradient vectors $1/K\ (g_1+g_2)$ when the sum of the channels or channel power (e.g., $\sigma_h$) is known. In other words, by knowing the sum of the channels or channel powers at each individual receive antenna (as opposed to each individual channel), the base station 702 may average out the fading associated with the channels and obtain an average of the received gradient vectors, which may be particularly helpful if the base station does not have channel state information for the channels. In some examples, the sum of received powers for the multiple channels may be referred to a "global CSI" as the base station may have access to the aggregate channels (sum of the channels), as discussed in the present disclosure.

In another aspect of the present disclosure, for a base station to implement an OTA gradient aggregation, the base station may configure a group of UEs that are going to participate in FL with group-common reference signals, such as demodulation reference signals (DMRSs) and sounding reference signal(s) (SRSs), etc. Then, the base station may configure the group of UEs to transmit the reference signals simultaneously and using a same reference signal sequence, such that the sum of the channels may be measured at one or more antennas at the base station. In one example, the base station may transmit a group-common reference signal format to the group of UEs using a group-common DCI. In another example, the simultaneous UL transmission of the group-common reference signals may be configured to be immediately (e.g., after a few symbols or within a threshold) followed by an uplink OTA gradient transmission in order for the measured channel state information (e.g., measured based on the group-common reference signal) to be up-to-date. In addition, a reference signal pattern specific to OTA gradient transmission may be defined for the UE, such that the UE may use the specified reference signal pattern for transmitting the group-common reference signal and/or the gradient vectors. In some examples, if a UE cannot participate in a federated learning round (e.g., due to MPE issue, gradient update not being ready, bad channel conditions, etc.), the UE may be configured to refrain from transmitting the group-common reference signal, and the UE may be configured to notify the base station regarding its inability to participate in that FL round, such that the base station may calculate the average gradient vector more accurately.

Figure 8:
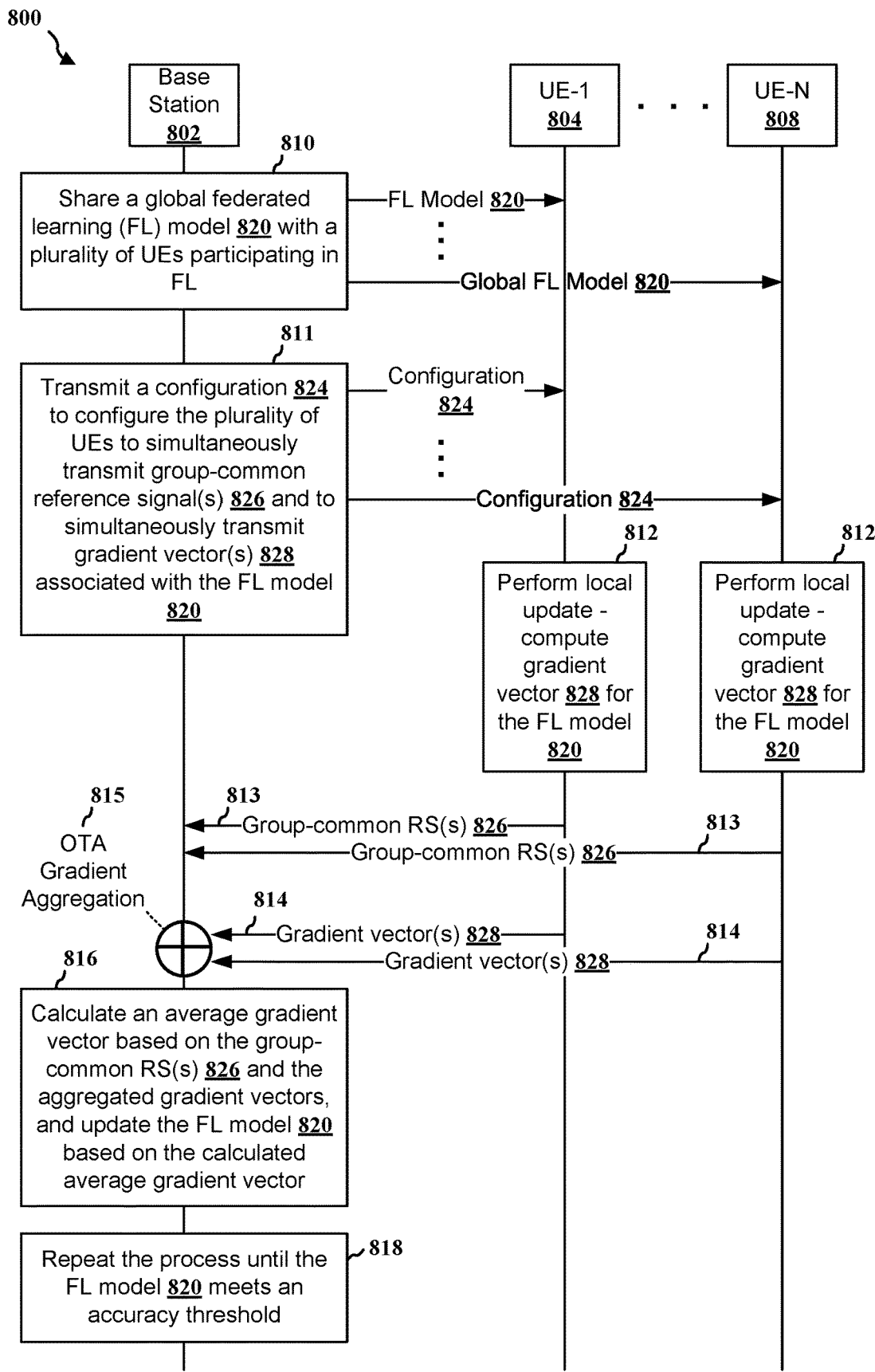
FIG. 8 is a communication flow illustrating an example of a base station configuring a group of UEs to transmit reference signals and gradient vectors simultaneously in accordance with various aspects of the present disclosure.

FIG. 8 is a communication flow 800 illustrating an example of a base station configuring a group of UEs to transmit reference signals and/or gradient vectors simultaneously in accordance with various aspects of the present disclosure. The numberings associated with the communication flow 800 do not specify a particular temporal order and are merely used as references for the communication flow 800.

At 810, a base station 802 may communicate with a plurality of UEs that are participants of an FL procedure, which may include a first UE 804 and up to $N^{th}$ UE 808, and the base station 802 may share a global FL model 820 with the plurality of UEs, such as described in connection with FIGS. 5 to 7. In one example, one or more FL model parameter(s) to be optimized (e.g., to be trained) may be denoted by $w^{(n)}$, and the initial FL parameter(s) may be denoted by $w^{(0)}$, where n may be an FL round index (e.g., a number of times the FL is performed).

At 811, the base station 802 may transmit a configuration 824 to the plurality of UEs to configure the plurality of UEs to simultaneously transmit one or more group-common reference signals 826 and to simultaneously transmit one or more gradient vectors 828 associated with the FL model 820 to the base station 802. For example, the configuration 824 may indicate a time in which the plurality of UEs may transmit the group-common reference signals 826 and the gradient vectors 828. In one example, the base station 802 may transmit the configuration 824 to the plurality of UEs via group-common downlink control information (DCI).

At 812, after receiving the global FL model 820, each of the plurality of UEs (e.g., the first UE 804, the $N^{th}$ UE 808, etc.) may perform a local update for the global FL model 820, such as described in connection with FIGS. 5 to 7. For example, a $k^{th}$ UE in the plurality of UEs may compute gradient vectors 828 associated with the FL model based on $g_k^{(n)} = \nabla F_k(w^{(n)})$, where $g_k^{(n)}$ may be the gradient vectors 828. In some examples, the plurality of UEs may compute the gradient vector based on SGD or other similar means. In other examples, the plurality of UEs may additionally perform gradient compression for the computed gradient based on $\tilde{g}_k^{(n)} = q(g_k^{(n)})$.

At 813, based on the configuration 824, the plurality of UEs may simultaneously transmit the group-common reference signals 826 to the base station 802, such as described in connection with FIGS. 6 and 7. For example, the first UE 804 and the $N^{th}$ UE 808 may transmit the group-common reference signals 826 to the base station 802 at a same time. After the base station 802 receives the group-common reference signals 826 from the plurality of UEs via multiple channels (e.g., from the first UE 804 via a first channel, from the $N^{th}$ UE 808 via an $N^{th}$ channel, etc.), the base station 802 may calculate a sum of received powers for the multiple channels (e.g., the sum of the channels, the sum of the channel powers, etc.) based on the group-common reference signals 826. In some examples, the configuration 824 may further configure the plurality of UEs to transmit the group-common reference signals 826 using a same reference signal sequence. In some examples, the sum of received powers for the multiple channels may be referred to a "global CSI" as the base station may have access to the aggregate channels (sum of the channels), as discussed in the present disclosure.

At 814, based on the configuration 824, and after the plurality of UEs complete the local update and transmit the group-common reference signals 826, the plurality of UEs may simultaneously transmit the computed gradient vectors 828 to the base station 802, such as described in connection with FIGS. 6 and 7. For example, the first UE 804 and the $N^{th}$ UE 808 may simultaneously transmit their computed gradient vectors 828 to the base station 802. Thus, as shown at 815, the gradient vectors 828 from the plurality of UEs may be aggregated over air, such as described in connection with FIGS. 6 and 7, and the base station 802 may receive the gradient vectors 828 based on an aggregated gradient vector. In some examples, the configuration 824 may configure the plurality of UEs to transmit their gradient vectors 828 after transmitting the group-common reference signals 826 and within a defined time period (e.g., within few symbols).

At 816, after the base station 802 receives the aggregated gradient vectors from the plurality of UEs, the base station 802 may compute an average gradient vector based on the aggregated gradient vector, such as by dividing the aggregated gradient vector with a number of UEs within the plurality of UEs (e.g., by N) or by a number of UEs that have transmitted the gradient vectors. Then, as described in connection with FIG. 7, the base station 802 may receive the aggregated gradient vectors via multiple antennas of the base station 802, and the base station 802 may average out a fading associated with the multiple channels by knowing the sum of the channels or channel powers at each antenna. As such, the average gradient vector may be calculated based at least in part on averaging out the fading. Then, the base station 802 may update the global FL model 820 based on the computed average gradient vector. For example, the base station 802 may update the FL model 820 based on $w^{(n+1)}=w^{(n)}-\eta \cdot g^{(n)}$, such as described in connection with FIGS. 5 and 6.

After the FL model 820 is updated, the base station 802 may transmit the updated FL model to the plurality of UEs, and at 818, the base station 802 may repeat the processes described in connection with FIG. 8 for multiple times until the global FL model 820 meets an accuracy threshold (e.g., until the global FL model 820 converges).

In one example, if a UE in the plurality of UEs is unable to participate the FL in an FL around, such as due to MPE issue, gradient update not being ready, bad channel conditions, etc., the UE may transmit an indication to the base station 802 to inform the base station 802 that the UE is not to participate in the FL round. In response, the base station may exclude the one or more UEs when calculating the average gradient vector. For example, the base station 802 may transmit the configuration 824 to ten UEs, and the base station 802 may calculate an average gradient vector by receiving an aggregated gradient vector from the ten UEs and divide the aggregated gradient vector by ten. However, if a UE is unable to participate the FL and the UE does not inform the base station 802, the base station 802 may receive an aggregated gradient vector that is from nine UEs and still divide the aggregated gradient vector by ten, which may create an inaccuracy for the average gradient vector calculation. As such, by configuring a UE to indicate to the base station 802 if the UE is unable to participate the FL in an FL round, the base station 802 may be able to exclude the UE from the average gradient vector calculation (e.g., the base station 802 may divide the aggregated gradient vector by nine).

In another example, an RS pattern may be defined for the FL procedure, where the base station 802 may configure the plurality of UEs (e.g., via the configuration 824 or another configuration) to use the defined RS pattern to transmit the group-common reference signals 826. For example, if the first UE 804 is to participate an FL around, the first UE 804 may use a specific RS pattern to transmit the group-common reference signals 826 and/or the gradient vectors 828 (e.g., with other UEs simultaneously).

Figure 9:
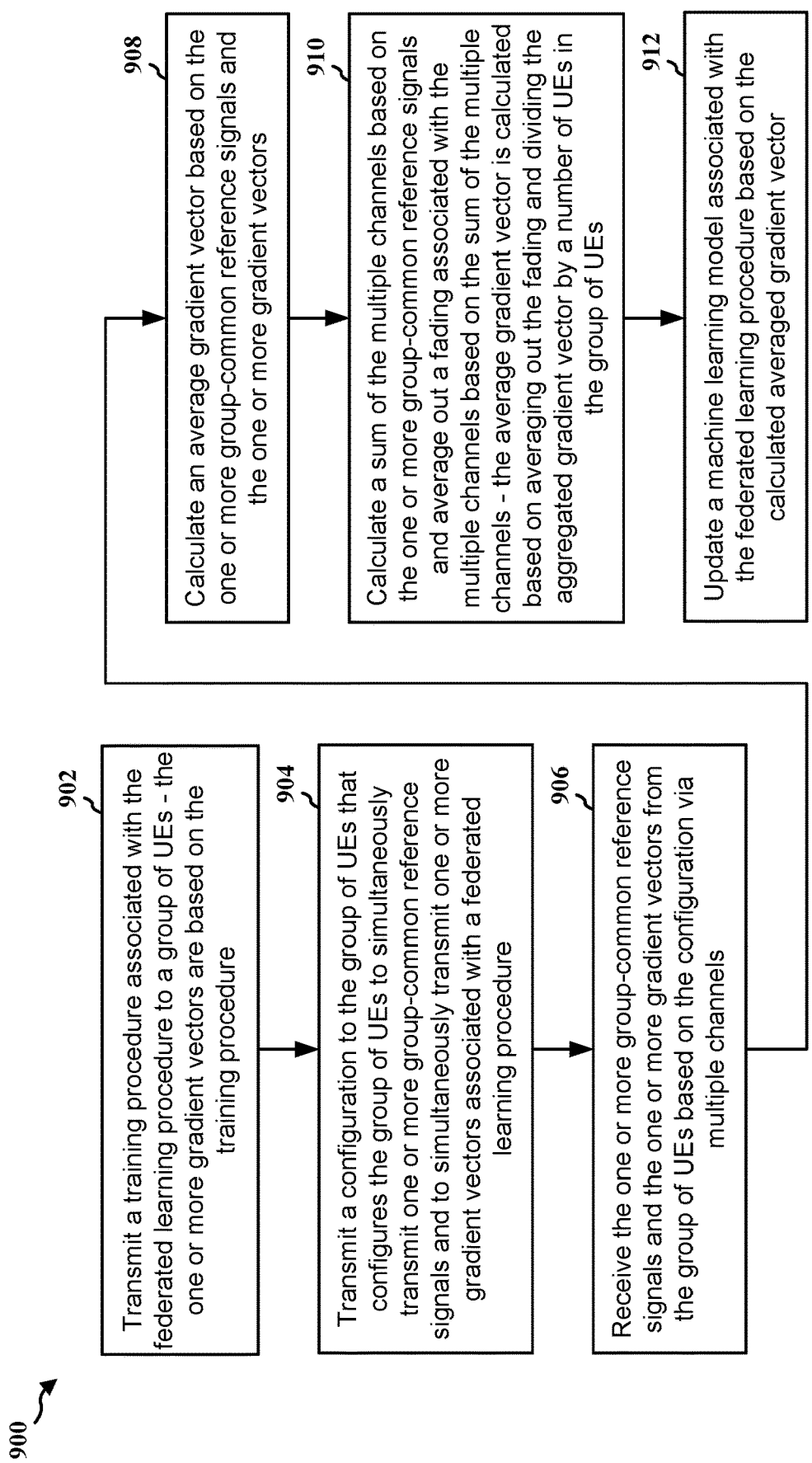
FIG. 9 is a flowchart of a method of wireless communication in accordance with aspects presented herein.

FIG. 9 is a flowchart 900 of a method of wireless communication. The method may be performed by a base station or a component of a base station (e.g., the base station 102, 310, 402, 502, 602, 702, 802; the apparatus 1102; a processing system, which may include the memory 376 and which may be the entire base station 310 or a component of the base station 310, such as the TX processor 316 the RX processor 370, and/or the controller/processor 375). The method may enable the base station to configure a group of UEs to simultaneously transmit reference signals and to simultaneously transmit gradient vectors to the base station, such that the base station may receive the gradient vectors from the group of UEs as an aggregated gradient vector over the air.

At 902, the base station may transmit, to the group of UEs, a training procedure associated with the federated learning procedure, where one or more gradient vectors may be based on the training procedure, such as described in connection with FIGS. 5, 6, and 8. For example, at 810, the base station 802 may share a global FL model 820 with a plurality of UEs participating in FL, where the FL model 820 may be associated with the gradient vectors 828. The transmission of the training procedure associated with the federated learning procedure may be performed by, e.g., the FL model configuration component 1140 and/or the transmission component 1134 of the apparatus 1102 in FIG. 11.

At 904, the base station may transmit, to a group of UEs, a configuration that configures the group of UEs to simultaneously transmit one or more group-common reference signals and to simultaneously transmit one or more gradient vectors associated with a federated learning procedure, such as described in connection with FIGS. 6 to 8. For example, at 811, the base station 802 may transmit, to a plurality of UEs, a configuration 824 that configures the plurality of UEs to simultaneously transmit group-common reference signals 826 and to simultaneously transmit gradient vector(s) 828 associated with the FL model 820. The transmission of the configuration may be performed by, e.g., the RS and gradient vector configuration component 1142 and/or the transmission component 1134 of the apparatus 1102 in FIG. 11. For example, the configuration may indicate a time in which the group of UEs are to transmit the one or more group-common reference signals and the one or more gradient vectors. The base station may transmit the configuration via group-common DCI. The group of UEs are participants of the federated learning procedure.

In one example, the configuration may further configure the group of UEs to transmit the one or more group-common reference signals using a same reference signal sequence.

In another example, the configuration may further configure the group of UEs to transmit the one or more gradient vectors after the one or more group-common reference signals and within a defined time period.

In another example, the one or more group-common reference signals and the one or more gradient vectors may be received via multiple antennas of the base station, such as described in connection with FIG. 7.

In another example, the base station may transmit, to the group of UEs, a second configuration that configures the group of UEs to transmit the one or more group-common reference signals based on a reference signal pattern specific to the federated learning procedure.

At 906, the base station may receive, from the group of UEs, the one or more group-common reference signals and the one or more gradient vectors based on the configuration via multiple channels, such as described in connection with FIGS. 6 to 8. For example, at 813, 814, and 815, the base station 802 may receive the group-common reference signals 826 and the gradient vectors 828 from the plurality of UEs based on the configuration 824. The reception of the one or more group-common reference signals and the one or more gradient vectors may be performed by, e.g., the RS and gradient vector process component 1144 and/or the reception component 1130 of the apparatus 1102 in FIG. 11.

In one example, the one or more gradient vectors may be aggregated over air, and the base station may receive the one or more gradient vectors based on an aggregated gradient vector, such as described in connection with FIGS. 7 and 8.

At 908, the base station may calculate an average gradient vector based on the one or more group-common reference signals and the one or more gradient vectors, such as described in connection with FIGS. 5 to 8. For example, at 816, the base station 802 may calculate an average gradient vector based on the group-common reference signals 826 and the aggregated gradient vectors. The calculation of the average gradient vector may be performed by, e.g., the average gradient vector computation component 1146 of the apparatus 1102 in FIG. 11.

In one example, the base station may receive, from one or more UEs in the group of UEs, an indication that indicates the one or more UEs are not participating in the federated learning procedure, then, the base station may exclude the one or more UEs when calculating the average gradient vector.

At 910, the base station may calculate a sum of the multiple channels based on the one or more group-common reference signals, and average out a fading associated with the multiple channels based on the sum of the multiple channels, where the average gradient vector may be calculated based on averaging out the fading and dividing the aggregated gradient vector by a number of UEs in the group of UEs, such as described in connection with FIGS. 7 and 8. The calculation of the sum of the multiple channels and the estimation of the fading associated with the multiple channels may be performed by, e.g., the fading process component 1148 and/or the reception component 1130 of the apparatus 1102 in FIG. 11.

At 912, the base station may update a machine learning model associated with the federated learning procedure based on the calculated averaged gradient vector, such as described in connection with FIGS. 5, 6, and 8. For example, at 816, the base station 802 may update the FL model 820 based on the calculated average gradient vector. The update of the machine learning model associated with the federated learning procedure may be performed by, e.g., the ML model update component 1150 of the apparatus 1102 in FIG. 11.

Figure 10:
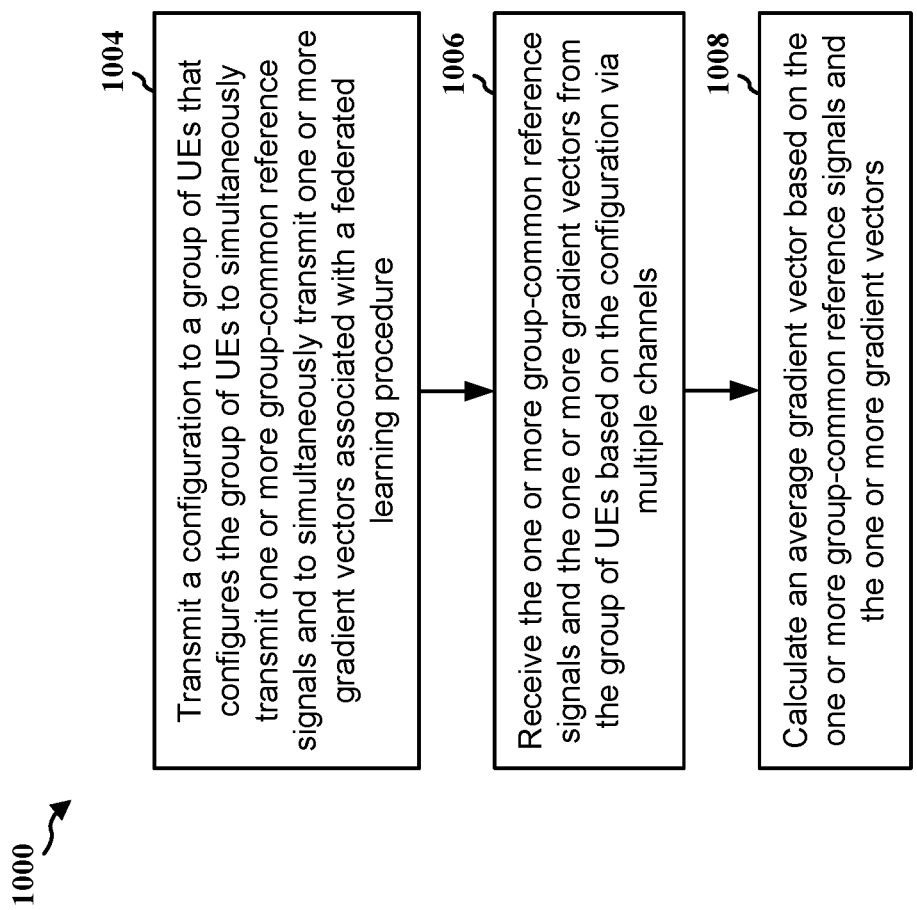
FIG. 10 is a flowchart of a method of wireless communication in accordance with aspects presented herein.

FIG. 10 is a flowchart 1000 of a method of wireless communication. The method may be performed by a base station or a component of a base station (e.g., the base station 102, 310, 402, 502, 602, 702, 802; the apparatus 1102; a processing system, which may include the memory 376 and which may be the entire base station 310 or a component of the base station 310, such as the TX processor 316 the RX processor 370, and/or the controller/processor 375). The method may enable the base station to configure a group of UEs to simultaneously transmit reference signals and to simultaneously transmit gradient vectors to the base station, such that the base station may receive the gradient vectors from the group of UEs as an aggregated gradient vector over the air.

In one example, a base station may transmit, to a group of UEs, a training procedure associated with the federated learning procedure, where one or more gradient vectors may be based on the training procedure, such as described in connection with FIGS. 5, 6, and 8. For example, at 810, the base station 802 may share a global FL model 820 with a plurality of UEs participating in FL, where the FL model 820 may be associated with the gradient vectors 828. The transmission of the training procedure associated with the federated learning procedure may be performed by, e.g., the FL model configuration component 1140 and/or the transmission component 1134 of the apparatus 1102 in FIG. 11.

At 1004, the base station may transmit, to the group of UEs, a configuration that configures the group of UEs to simultaneously transmit one or more group-common reference signals and to simultaneously transmit one or more gradient vectors associated with a federated learning procedure, such as described in connection with FIGS. 6 to 8. For example, at 811, the base station 802 may transmit, to a plurality of UEs, a configuration 824 that configures the plurality of UEs to simultaneously transmit the group-common reference signals 826 and to simultaneously transmit the gradient vector(s) 828 associated with the FL model 820. The transmission of the configuration may be performed by, e.g., the RS and gradient vector configuration component 1142 and/or the transmission component 1134 of the apparatus 1102 in FIG. 11. For example, the configuration may indicate a time in which the group of UEs are to transmit the one or more group-common reference signals and the one or more gradient vectors. The base station may transmit the configuration via group-common DCI. The group of UEs are participants of the federated learning procedure In one example, the configuration may further configure the group of UEs to transmit the one or more group-common reference signals using a same reference signal sequence.

In another example, the configuration may further configure the group of UEs to transmit the one or more gradient vectors after the one or more group-common reference signals and within a defined time period.

In another example, the one or more group-common reference signals and the one or more gradient vectors may be received via multiple antennas of the base station, such as described in connection with FIG. 7.

In another example, the base station may transmit, to the group of UEs, a second configuration that configures the group of UEs to transmit the one or more group-common reference signals based on a reference signal pattern specific to the federated learning procedure.

At 1006, the base station may receive, from the group of UEs, the one or more group-common reference signals and the one or more gradient vectors based on the configuration via multiple channels, such as described in connection with FIGS. 6 to 8. For example, at 813, 814, and 815, the base station 802 may receive the group-common reference signals 826 and the gradient vectors 828 from the plurality of UEs based on the configuration 824. The reception of the one or more group-common reference signals and the one or more gradient vectors may be performed by, e.g., the RS and gradient vector process component 1144 and/or the reception component 1130 of the apparatus 1102 in FIG. 11.

In one example, the one or more gradient vectors may be aggregated over air, and the base station may receive the one or more gradient vectors based on an aggregated gradient vector, such as described in connection with FIGS. 7 and 8.

At 1008, the base station may calculate an average gradient vector based on the one or more group-common reference signals and the one or more gradient vectors, such as described in connection with FIGS. 5 to 8. For example, at 816, the base station 802 may calculate an average gradient vector based on the group-common reference signals 826 and the aggregated gradient vectors. The calculation of the average gradient vector may be performed by, e.g., the average gradient vector computation component 1146 of the apparatus 1102 in FIG. 11.

In one example, the base station may receive, from one or more UEs in the group of UEs, an indication that indicates the one or more UEs are not participating in the federated learning procedure, then, the base station may exclude the one or more UEs when calculating the average gradient vector.

In another example, the base station may calculate a sum of the multiple channels based on the one or more group-common reference signals, and average out a fading associated with the multiple channels based on the sum of the multiple channels, where the average gradient vector may be calculated based on averaging out the fading and dividing the aggregated gradient vector by a number of UEs in the group of UEs, such as described in connection with FIGS. 7 and 8. The calculation of the sum of the multiple channels and the estimation of the fading associated with the multiple channels may be performed by, e.g., the fading process component 1148 and/or the reception component 1130 of the apparatus 1102 in FIG. 11.

In another example, the base station may update a machine learning model associated with the federated learning procedure based on the calculated averaged gradient vector, such as described in connection with FIGS. 5, 6, and 8. For example, at 816, the base station 802 may update the FL model 820 based on the calculated average gradient vector. The update of the machine learning model associated with the federated learning procedure may be performed by, e.g., the ML model update component 1150 of the apparatus 1102 in FIG. 11.

Figure 11:
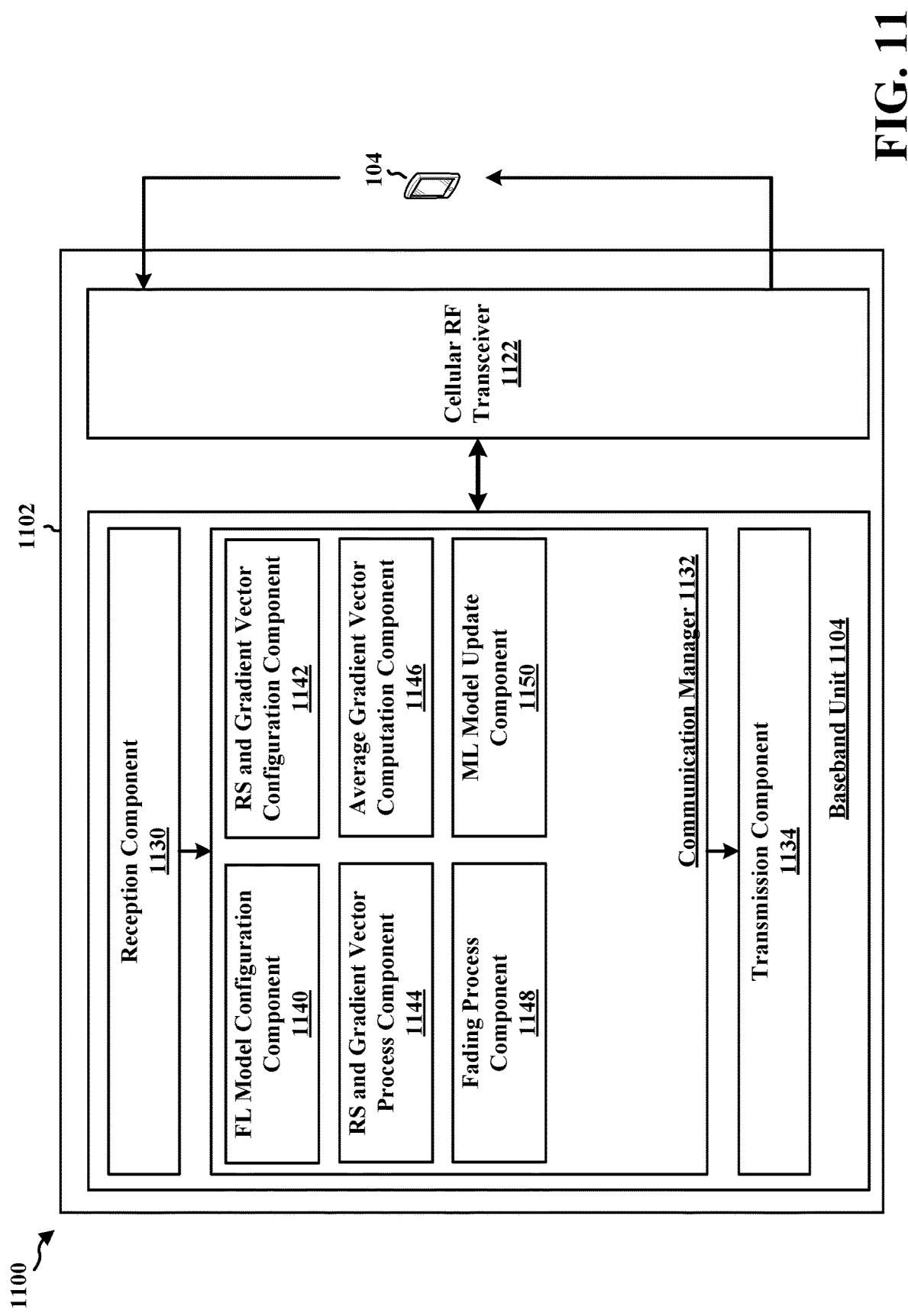
FIG. 11 is a diagram illustrating an example of a hardware implementation for an example apparatus in accordance with aspects presented herein.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes an FL model configuration component 1140 that transmits, to the group of UEs, a training procedure associated with the federated learning procedure, where the one or more gradient vectors are based on the training procedure, e.g., as described in connection with 902 of FIG. 9. The communication manager 1132 further includes an RS and gradient vector configuration component 1142 that transmits, to a group of UEs, a configuration that configures the group of UEs to simultaneously transmit one or more group-common reference signals and to simultaneously transmit one or more gradient vectors associated with a federated learning procedure, e.g., as described in connection with 904 of FIGS. 9 and/or 1004 of FIG. 10. The communication manager 1132 further includes an RS and gradient vector process component 1144 that receives, from the group of UEs, the one or more group-common reference signals and the one or more gradient vectors based on the configuration via multiple channels, e.g., as described in connection with 906 of FIGS. 9 and/or 1006 of FIG. 10. The communication manager 1132 further includes an average gradient vector computation component 1146 that calculates an average gradient vector based on the one or more group-common reference signals and the one or more gradient vectors, e.g., as described in connection with 908 of FIGS. 9 and/or 1008 of FIG. 10. The communication manager 1132 further includes a fading process component 1148 that calculates a sum of the multiple channels based on the one or more group-common reference signals, and average out a fading associated with the multiple channels based on the sum of the multiple channels, where the average gradient vector is calculated based on averaging out the fading and dividing the aggregated gradient vector by a number of UEs in the group of UEs, e.g., as described in connection with 910 of FIG. 9. The communication manager 1132 further includes an ML model update component 1150 that updates a machine learning model associated with the federated learning procedure based on the calculated averaged gradient vector, e.g., as described in connection with 912 of FIG. 9.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to the group of UEs, a training procedure associated with the federated learning procedure, where the one or more gradient vectors are based on the training procedure (e.g., the FL model configuration component 1140 and/or the transmission component 1134). The apparatus 902 includes means for transmitting, to a group of UEs, a configuration that configures the group of UEs to simultaneously transmit one or more group-common reference signals and to simultaneously transmit one or more gradient vectors associated with a federated learning procedure (e.g., the RS and gradient vector configuration component 1142 and/or the transmission component 1134). The apparatus 902 includes means for receiving, from the group of UEs, the one or more group-common reference signals and the one or more gradient vectors based on the configuration via multiple channels (e.g., the RS and gradient vector process component 1144 and/or the reception component 1130). The apparatus 902 includes means for calculating an average gradient vector based on the one or more group-common reference signals and the one or more gradient vectors (e.g., the average gradient vector computation component 1146). The apparatus 902 includes means for calculating a sum of the multiple channels based on the one or more group-common reference signals, and means for averaging out a fading associated with the multiple channels based on the sum of the multiple channels, where the average gradient vector is calculated based on averaging out the fading and dividing the aggregated gradient vector by a number of UEs in the group of UEs (e.g., the fading process component 1148 and/or the reception component 1130). The apparatus 902 includes means for updating a machine learning model associated with the federated learning procedure based on the calculated averaged gradient vector (e.g., the ML model update component 1150).

In one example, the configuration may indicate a time in which the group of UEs are to transmit the one or more group-common reference signals and the one or more gradient vectors. The configuration may be transmitted via group-common DCI. The group of UEs may be participants of the federated learning procedure.

In another example, the configuration may further configure the group of UEs to transmit the one or more group-common reference signals using a same reference signal sequence.

In another example, the configuration may further configure the group of UEs to transmit the one or more gradient vectors after the one or more group-common reference signals and within a defined time period.

In another example, the one or more group-common reference signals and the one or more gradient vectors are received via multiple antennas.

In another example, the apparatus 902 includes means for transmitting, to the group of UEs, a second configuration that configures the group of UEs to transmit the one or more group-common reference signals based on a reference signal pattern specific to the federated learning procedure.

In another example, the one or more gradient vectors may be aggregated over air, and the one or more gradient vectors may be received based on an aggregated gradient vector.

In another example, the apparatus 902 includes means for receiving, from one or more UEs in the group of UEs, an indication that indicates the one or more UEs are not participating in the federated learning procedure, and means for excluding the one or more UEs when calculating the average gradient vector.

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
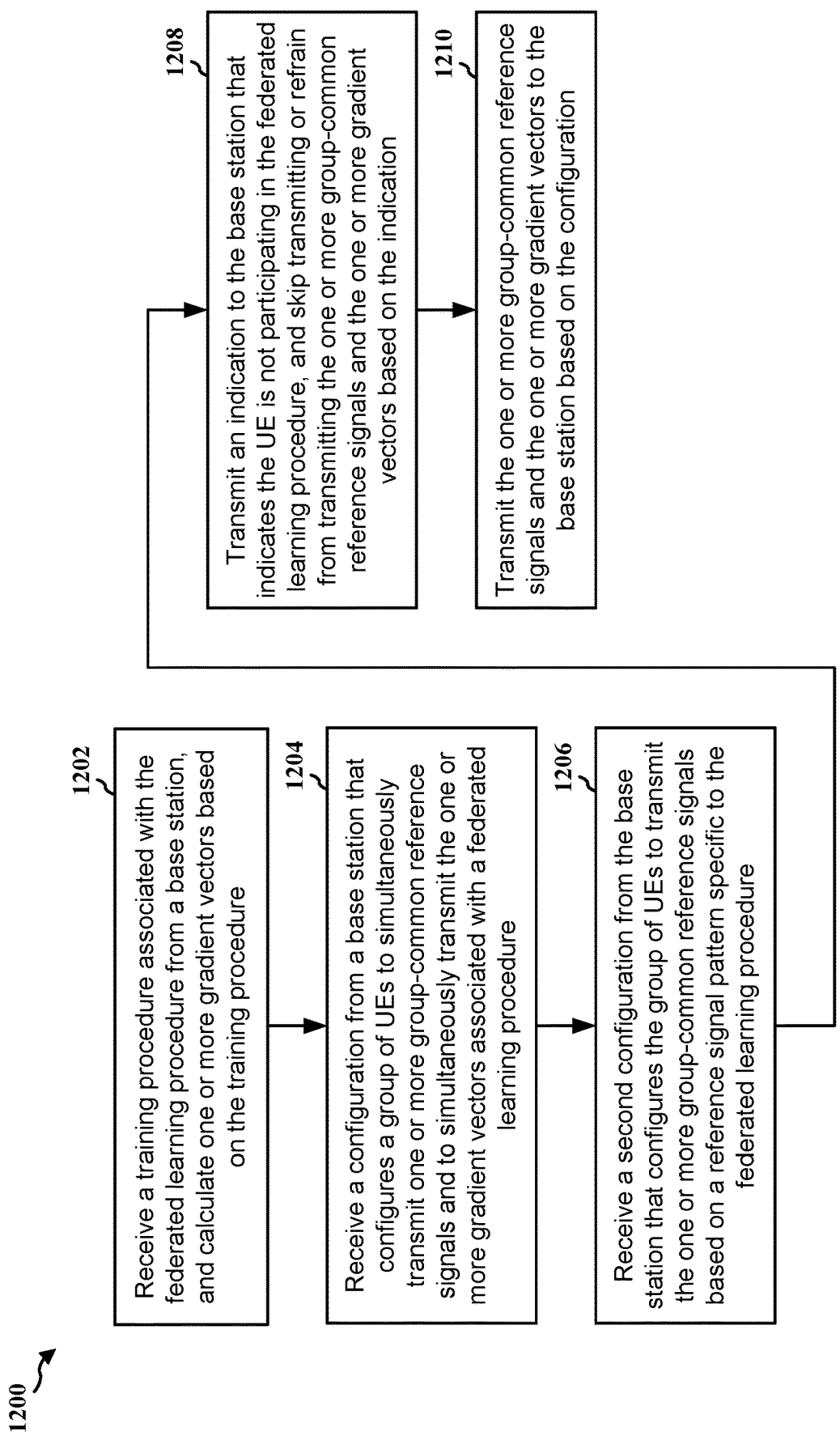
FIG. 12 is a flowchart of a method of wireless communication in accordance with aspects presented herein.

FIG. 12 is a flowchart 1200 of a method of wireless communication. The method may be performed by a UE or a component of a UE (e.g., the UE 104, 350, 504, 506, 508, 604, 606, 608, 704, 706, 804, 808; UEs 404; the apparatus 1402; a processing system, which may include the memory 360 and which may be the entire UE 350 or a component of the UE 350, such as the TX processor 368, the RX processor 356, and/or the controller/processor 359). The method may enable the UE to transmit reference signals associated with FL simultaneously with other UEs and also to transmit gradient vectors associated with the FL simultaneously with other UEs.

At 1202, the UE may receive, from the base station, a training procedure associated with the federated learning procedure, and calculate the one or more gradient vectors based on the training procedure, such as described in connection with FIGS. 5, 6, and 8. For example, at 810, the first UE 804 may receive a global FL model 820 from the base station 802, where the FL model 820 may be associated with the FL procedure. Then, the first UE 804 may calculate the gradient vectors 828 based on the FL model 820. The reception of the training procedure may be performed by, e.g., the FL model process component 1440 and/or the reception component 1430 of the apparatus 1402 in FIG. 14. Thus, the UE may be a participant of the federated learning procedure.

At 1204, the UE may receive, from a base station, a configuration that configures a group of UEs to simultaneously transmit one or more group-common reference signals and to simultaneously transmit one or more gradient vectors associated with a federated learning procedure, such as described in connection with FIG. 8. For example, at 811, the first UE 804 may receive a configuration 824 from the base station 802 that configures a plurality of UEs to simultaneously transmit group-common reference signals 826 and to simultaneously transmit gradient vectors 828 which are associated with the FL model 820. The reception of the configuration may be performed by, e.g., the RS/gradient configuration process component 1442 and/or reception component 1430 of the apparatus 1402 in FIG. 14. The configuration may be received via a group-common DCI.

In one example, the configuration may further configure the group of UEs to transmit the one or more group-common reference signals using a same reference signal sequence.

In another example, the configuration may further configure the group of UEs to transmit the one or more gradient vectors after the one or more group-common reference signals and within a defined time period.

In another example, the configuration may indicate a time in which the group of UEs are to transmit the one or more group-common reference signals and the one or more gradient vectors.

In some examples, at 1206, the UE may receive, from the base station, a second configuration that configures the group of UEs to transmit the one or more group-common reference signals based on a reference signal pattern specific to the federated learning procedure, such as described in connection with FIG. 8. The reception of the second configuration may be performed by, e.g., the RS pattern configuration component 1444 and/or the reception component 1430 of the apparatus 1402 in FIG. 14.

In other examples, at 1208, the UE may transmit, to the base station, an indication that indicates the UE is not participating in the federated learning procedure, and skip transmitting or refrain from transmitting the one or more group-common reference signals and the one or more gradient vectors based on the indication, such as described in connection with FIG. 8. The transmission of the indication may be performed by, e.g., the FL skipping indication component 1446 and/or the transmission component 1434 of the apparatus 1402 in FIG. 14.

At 1210, the UE may transmit, to the base station, the one or more group-common reference signals and the one or more gradient vectors based on the configuration, such as described in connection with FIG. 8. For example, at 813 and 814, the first UE 804 may transmit, to the base station 802, the group-common reference signals 826 and the gradient vectors 828 based on the configuration 824. The transmission of the one or more group-common reference signals and the one or more gradient vectors may be performed by, e.g., the RS and gradient vector configuration component 1448 and/or the transmission component 1434 of the apparatus 1402 in FIG. 14.

In one example, the one or more group-common reference signals and the one or more gradient vectors may be transmitted to multiple antennas of the base station.

Figure 13:
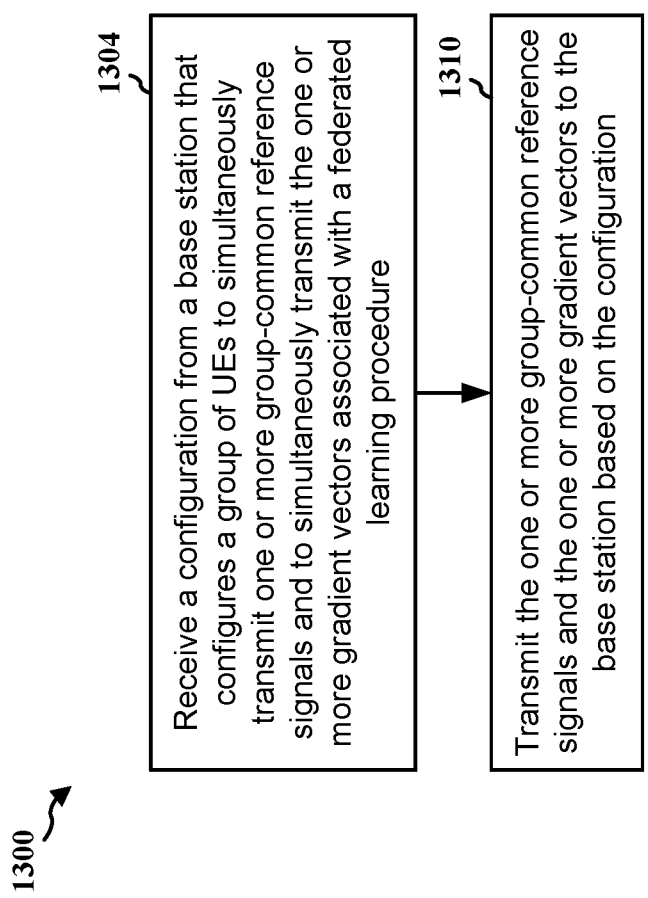
FIG. 13 is a flowchart of a method of wireless communication in accordance with aspects presented herein.

FIG. 13 is a flowchart 1300 of a method of wireless communication. The method may be performed by a UE or a component of a UE (e.g., the UE 104, 350, 504, 506, 508, 604, 606, 608, 704, 706, 804, 808; UEs 404; the apparatus 1402; a processing system, which may include the memory 360 and which may be the entire UE 350 or a component of the UE 350, such as the TX processor 368, the RX processor 356, and/or the controller/processor 359). The method may enable the UE to transmit reference signals associated with FL simultaneously with other UEs and also to transmit gradient vectors associated with the FL simultaneously with other UEs.

In one example, the UE may receive, from the base station, a training procedure associated with the federated learning procedure, and calculate the one or more gradient vectors based on the training procedure, such as described in connection with FIGS. 5, 6, and 8. For example, at 810, the first UE 804 may receive a global FL model 820 from the base station 802, where the FL model 820 may be associated with the FL procedure. Then, the first UE 804 may calculate the gradient vectors 828 based on the FL model 820. The reception of the training procedure may be performed by, e.g., the FL model process component 1440 and/or the reception component 1430 of the apparatus 1402 in FIG. 14. Thus, the UE may be a participant of the federated learning procedure.

At 1304, the UE may receive, from a base station, a configuration that configures a group of UEs to simultaneously transmit one or more group-common reference signals and to simultaneously transmit one or more gradient vectors associated with a federated learning procedure, such as described in connection with FIG. 8. For example, at 811, the first UE 804 may receive a configuration 824 from the base station 802 that configures a plurality of UEs to simultaneously transmit group-common reference signals 826 and to simultaneously transmit gradient vectors 828 which are associated with the FL model 820. The reception of the configuration may be performed by, e.g., the RS/gradient configuration process component 1442 and/or reception component 1430 of the apparatus 1402 in FIG. 14. The configuration may be received via a group-common DCI.

In one example, the configuration may further configure the group of UEs to transmit the one or more group-common reference signals using a same reference signal sequence.

In another example, the configuration may further configure the group of UEs to transmit the one or more gradient vectors after the one or more group-common reference signals and within a defined time period.

In another example, the configuration may indicate a time in which the group of UEs are to transmit the one or more group-common reference signals and the one or more gradient vectors.

In some examples, the UE may receive, from the base station, a second configuration that configures the group of UEs to transmit the one or more group-common reference signals based on a reference signal pattern specific to the federated learning procedure, such as described in connection with FIG. 8. The reception of the second configuration may be performed by, e.g., the RS pattern configuration component 1444 and/or the reception component 1430 of the apparatus 1402 in FIG. 14.

In other examples, the UE may transmit, to the base station, an indication that indicates the UE is not participating in the federated learning procedure, and skip transmitting or refrain from transmitting the one or more group-common reference signals and the one or more gradient vectors based on the indication, such as described in connection with FIG. 8. The transmission of the indication may be performed by, e.g., the FL skipping indication component 1446 and/or the transmission component 1434 of the apparatus 1402 in FIG. 14.

At 1310, the UE may transmit, to the base station, the one or more group-common reference signals and the one or more gradient vectors based on the configuration, such as described in connection with FIG. 8. For example, at 813 and 814, the first UE 804 may transmit, to the base station 802, the group-common reference signals 826 and the gradient vectors 828 based on the configuration 824. The transmission of the one or more group-common reference signals and the one or more gradient vectors may be performed by, e.g., the RS and gradient vector configuration component 1448 and/or the transmission component 1434 of the apparatus 1402 in FIG. 14.

In one example, the one or more group-common reference signals and the one or more gradient vectors may be transmitted to multiple antennas of the base station.

Figure 14:
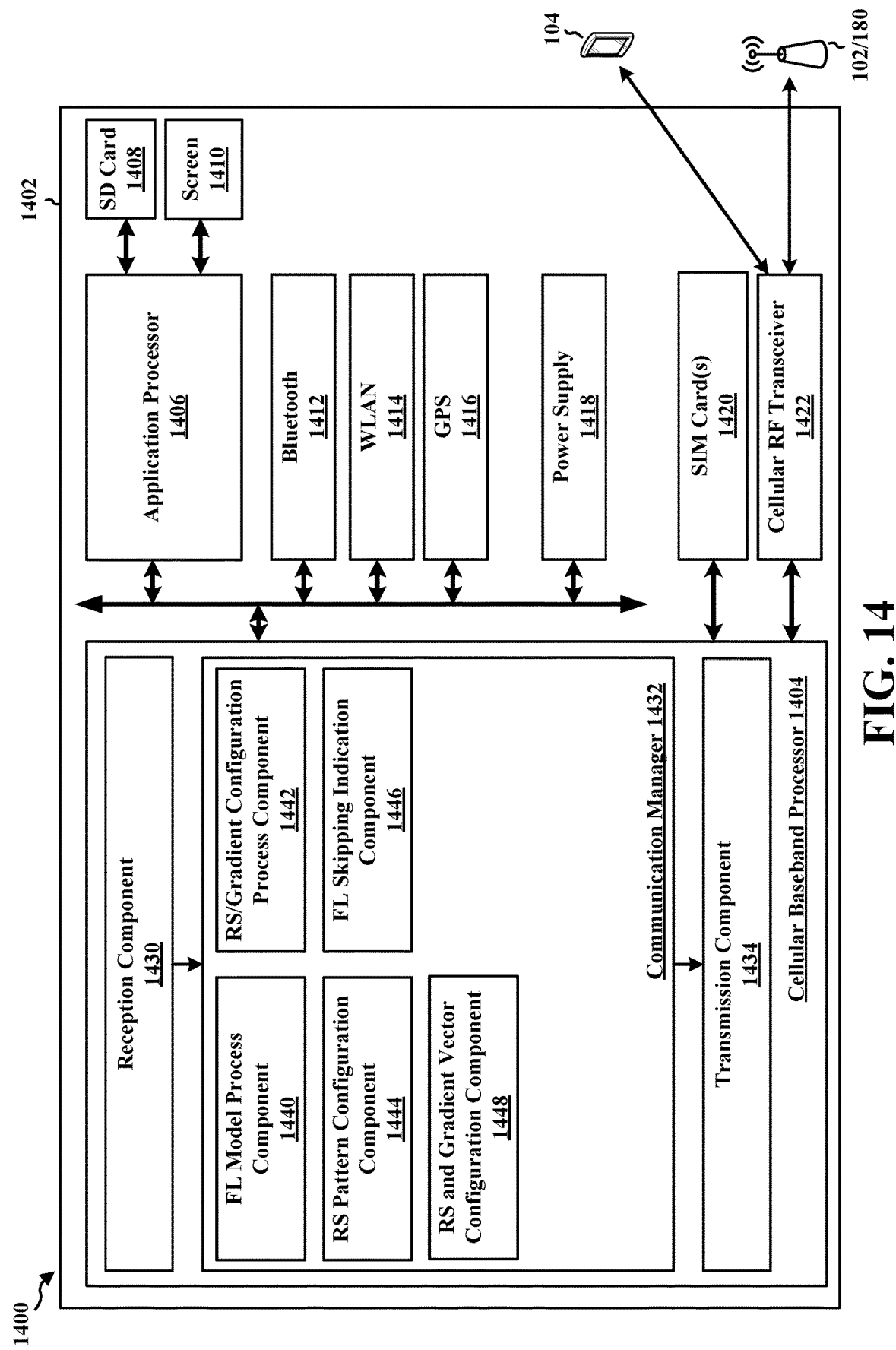
FIG. 14 is a diagram illustrating an example of a hardware implementation for an example apparatus in accordance with aspects presented herein.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes an FL model process component 1440 that is configured to receive, from the base station, a training procedure associated with the federated learning procedure and calculate the one or more gradient vectors based on the training procedure, e.g., as described in connection with 1202 of FIG. 12. The communication manager 1432 further includes an RS/gradient configuration process component 1442 that is configured to receive, from a base station, a configuration that configures a group of UEs to simultaneously transmit one or more group-common reference signals and to simultaneously transmit one or more gradient vectors associated with a federated learning procedure, e.g., as described in connection with 1204 of FIGS. 12 and/or 1304 of FIG. 13. The communication manager 1432 further includes an RS pattern configuration component 1444 that is configured to receive, from the base station, a second configuration that configures the group of UEs to transmit the one or more group-common reference signals based on a reference signal pattern specific to the federated learning procedure, e.g., as described in connection with 1206 of FIG. 12. The communication manager 1432 further includes an FL skipping indication component 1446 that is configured to transmit, to the base station, an indication that indicates the UE is not participating in the federated learning procedure, and skip transmitting or refrain from transmitting the one or more group-common reference signals and the one or more gradient vectors based on the indication, e.g., as described in connection with 1208 of FIG. 12. The communication manager 1432 further includes an RS and gradient vector configuration component 1448 that is configured to receive, from a base station, a configuration that configures a group of UEs to simultaneously transmit one or more group-common reference signals and to simultaneously transmit one or more gradient vectors associated with a federated learning procedure, e.g., as described in connection with 1210 of FIGS. 12 and/or 1310 of FIG. 13.

The apparatus may include additional components that perform each of the blocks of the algorithm in the flowcharts of FIGS. 12 and 13. As such, each block in the flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from the base station, a training procedure associated with the federated learning procedure, and means for calculating the one or more gradient vectors based on the training procedure (e.g., the FL model process component 1440 and/or the reception component 1430). The apparatus 1402 includes means for receiving, from a base station, a configuration that configures a group of UEs to simultaneously transmit one or more group-common reference signals and to simultaneously transmit one or more gradient vectors associated with a federated learning procedure (e.g., the RS/gradient configuration process component 1442 and/or reception component 1430). The apparatus 1402 includes means for receiving, from the base station, a second configuration that configures the group of UEs to transmit the one or more group-common reference signals based on a reference signal pattern specific to the federated learning procedure (e.g., the RS pattern configuration component 1444 and/or the reception component 1430). The apparatus 1402 includes means for transmitting, to the base station, an indication that indicates the UE is not participating in the federated learning procedure, and means for skipping transmitting or refrain from transmitting the one or more group-common reference signals and the one or more gradient vectors based on the indication (e.g., the FL skipping indication component 1446 and/or the transmission component 1434). The apparatus 1402 includes means for transmitting, to the base station, the one or more group-common reference signals and the one or more gradient vectors based on the configuration (e.g., the RS and gradient vector configuration component 1448 and/or the transmission component 1434).

In one example, the configuration may further configure the group of UEs to transmit the one or more group-common reference signals using a same reference signal sequence.

In another example, the configuration may further configure the group of UEs to transmit the one or more gradient vectors after the one or more group-common reference signals and within a defined time period.

In another example, the configuration may indicate a time in which the group of UEs are to transmit the one or more group-common reference signals and the one or more gradient vectors.

In one example, the one or more group-common reference signals and the one or more gradient vectors may be transmitted to multiple antennas of the base station.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a network entity including at least one processor coupled to a memory and configured to transmit a configuration to a group of UEs that configures the group of UEs to simultaneously transmit one or more group-common reference signals and to simultaneously transmit one or more gradient vectors associated with a federated learning procedure; receive the one or more group-common reference signals and the one or more gradient vectors from the group of UEs based on the configuration via multiple channels; and calculate an average gradient vector based on the one or more group-common reference signals and the one or more gradient vectors.

Aspect 2 is the apparatus of aspect 1, where the configuration further configures the group of UEs to transmit the one or more group-common reference signals using a same reference signal sequence.

Aspect 3 is the apparatus of any of aspects 1 and 2, where the configuration further configures the group of UEs to transmit the one or more gradient vectors after the one or more group-common reference signals and within a defined time period.

Aspect 4 is the apparatus of any of aspects 1 to 3, where the one or more gradient vectors are aggregated over air, the at least one processor is further configured to receive the one or more gradient vectors based on an aggregated gradient vector.

Aspect 5 is the apparatus of aspect 4, where the at least one processor is further configured to: calculate a sum of the multiple channels based on the one or more group-common reference signals; and average out a fading associated with the multiple channels based on the sum of the multiple channels, where the average gradient vector is calculated based on averaging out the fading and dividing the aggregated gradient vector by a number of UEs in the group of UEs.

Aspect 6 is the apparatus of any of aspects 1 to 5, where the one or more group-common reference signals and the one or more gradient vectors are received via multiple antennas.

Aspect 7 is the apparatus of any of aspects 1 to 6, where the configuration indicates a time in which the group of UEs are to transmit the one or more group-common reference signals and the one or more gradient vectors.

Aspect 8 is the apparatus of any of aspects 1 to 7, where the at least one processor is further configured to: update a machine learning model associated with the federated learning procedure based on the averaged gradient vector.

Aspect 9 is the apparatus of any of aspects 1 to 8, where the configuration is transmitted via group-common DCI.

Aspect 10 is the apparatus of any of aspects 1 to 9, where the group of UEs are participants of the federated learning procedure.

Aspect 11 is the apparatus of any of aspects 1 to 10, where the at least one processor is further configured to: receive, from one or more UEs in the group of UEs, an indication that indicates the one or more UEs are not participating in the federated learning procedure; and exclude the one or more UEs when calculating the average gradient vector.

Aspect 12 is the apparatus of any of aspects 1 to 11, where the at least one processor is further configured to: transmit, to the group of UEs, a second configuration that configures the group of UEs to transmit the one or more group-common reference signals based on a reference signal pattern specific to the federated learning procedure.

Aspect 13 is the apparatus of any of aspects 1 to 12, where the at least one processor is further configured to: transmit, to the group of UEs, a training procedure associated with the federated learning procedure, where the one or more gradient vectors are based on the training procedure, further including a transceiver coupled to the at least one processor, where the configuration is transmitted via the transceiver.

Aspect 14 is a method of wireless communication for implementing any of aspects 1 to 13.

Aspect 15 is an apparatus for wireless communication including means for implementing any of aspects 1 to 13.

Aspect 16 is a computer-readable medium (e.g., a non-transitory computer-readable medium) storing computer executable code, where the code when executed by a processor causes the processor to implement any of aspects 1 to 13.

Aspect 17 is an apparatus for wireless communication including at least one processor coupled to a memory and configured to receive a configuration from a network entity that configures a group of UEs to simultaneously transmit one or more group-common reference signals and to simultaneously transmit one or more gradient vectors associated with a federated learning procedure; and transmit the one or more group-common reference signals and the one or more gradient vectors to the network entity based on the configuration.

Aspect 18 is the apparatus of aspect 17, where the configuration further configures the group of UEs to transmit the one or more group-common reference signals using a same reference signal sequence.

Aspect 19 is the apparatus of any of aspects 17 and 18, where the configuration further configures the group of UEs to transmit the one or more gradient vectors after the one or more group-common reference signals and within a defined time period.

Aspect 20 is the apparatus of any of aspects 17 to 19, where the one or more group-common reference signals and the one or more gradient vectors are transmitted to multiple antennas of the network entity.

Aspect 21 is the apparatus of any of aspects 17 to 20, where the configuration indicate s a time in which the group of UEs are to transmit the one or more group-common reference signals and the one or more gradient vectors.

Aspect 22 is the apparatus of any of aspects 17 to 21, where the configuration is received via group-common DCI.

Aspect 23 is the apparatus of any of aspects 17 to 22, where the UE is a participant of the federated learning procedure.

Aspect 24 is the apparatus of any of aspects 17 to 23, where the at least one processor is further configured to: transmit, to the network entity, an indication that indicate s the UE is not participating in the federated learning procedure; and skip transmitting or refrain from transmitting the one or more group-common reference signals and the one or more gradient vectors based on the indication.

Aspect 25 is the apparatus of any of aspects 17 to 24, where the at least one processor is further configured to: receive, from the network entity, a second configuration that configures the group of UEs to transmit the one or more group-common reference signals based on a reference signal pattern specific to the federated learning procedure.

Aspect 26 is the apparatus of any of aspects 17 to 25, where the at least one processor is further configured to: receive, from the network entity, a training procedure associated with the federated learning procedure; and calculate the one or more gradient vectors based on the training procedure, further including a transceiver coupled to the at least one processor, where the configuration is received via the transceiver.

Aspect 27 is a method of wireless communication for implementing any of aspects 17 to 26.

Aspect 28 is an apparatus for wireless communication including means for implementing any of aspects 17 to 26.

Aspect 29 is a computer-readable medium (e.g., a non-transitory computer-readable medium) storing computer executable code, where the code when executed by a processor causes the processor to implement any of aspects 17 to 26.

What is claimed is:

1. An apparatus for wireless communication at a network entity, comprising:
    a memory; and
    at least one processor coupled to the memory and configured to:
        transmit a configuration to a group of user equipments (UEs) that configures the group of UEs to simultaneously transmit one or more group-common reference signals and to simultaneously transmit one or more gradient vectors associated with a federated learning procedure;
        receive the one or more group-common reference signals and the one or more gradient vectors from the group of UEs based on the configuration via multiple channels; and
        calculate an average gradient vector based on the one or more group-common reference signals and the one or more gradient vectors.

2. The apparatus of claim 1, wherein the configuration further configures the group of UEs to transmit the one or more group-common reference signals using a same reference signal sequence.

3. The apparatus of claim 1, wherein the configuration further configures the group of UEs to transmit the one or more gradient vectors after the one or more group-common reference signals and within a defined time period.

4. The apparatus of claim 1, wherein the one or more gradient vectors are aggregated over air, and wherein the at least one processor is further configured to receive the one or more gradient vectors based on an aggregated gradient vector.

5. The apparatus of claim 4, wherein the at least one processor is further configured to:
    calculate a sum of the multiple channels based on the one or more group-common reference signals; and
    average out a fading associated with the multiple channels based at least in part on the sum of the multiple channels,
    wherein the average gradient vector is calculated based on averaging out the fading and dividing the aggregated gradient vector by a number of UEs in the group of UEs.

6. The apparatus of claim 1, wherein the one or more group-common reference signals and the one or more gradient vectors are received via multiple antennas.

7. The apparatus of claim 1, wherein the configuration indicates a time in which the group of UEs are to transmit the one or more group-common reference signals and the one or more gradient vectors.

8. The apparatus of claim 1, wherein the at least one processor is further configured to:
    update a machine learning model associated with the federated learning procedure based on the averaged gradient vector.

9. The apparatus of claim 1, wherein the configuration is transmitted via group-common downlink control information (DCI).

10. The apparatus of claim 1, wherein the group of UEs are participants of the federated learning procedure.

11. The apparatus of claim 1, wherein the at least one processor is further configured to:
    receive an indication from one or more UEs in the group of UEs that indicates the one or more UEs are not participating in the federated learning procedure; and
    exclude the one or more UEs when calculating the average gradient vector.

12. The apparatus of claim 1, wherein the at least one processor is further configured to:
    transmit a second configuration to the group of UEs that configures the group of UEs to transmit the one or more group-common reference signals based on a reference signal pattern specific to the federated learning procedure.

13. The apparatus of claim 1, wherein the at least one processor is further configured to:
    transmit a training procedure associated with the federated learning procedure to the group of UEs, wherein the one or more gradient vectors are based on the training procedure.

14. The apparatus of claim 1, further comprising a transceiver coupled to the at least one processor, wherein the configuration is transmitted via the transceiver.

15. A method of wireless communication at a network entity, comprising:
    transmitting a configuration to a group of user equipments (UEs) that configures the group of UEs to simultaneously transmit one or more group-common reference signals and to simultaneously transmit one or more gradient vectors associated with a federated learning procedure;
    receiving the one or more group-common reference signals and the one or more gradient vectors from the group of UEs based on the configuration via multiple channels; and
    calculating an average gradient vector based on the one or more group-common reference signals and the one or more gradient vectors.

16. The method of claim 15, wherein the one or more gradient vectors are aggregated over air, the method further comprising: receiving the one or more gradient vectors based on an aggregated gradient vector.

17. The method of claim 16, further comprising:
    calculating a sum of the multiple channels based on the one or more group-common reference signals; and
    averaging out a fading associated with the multiple channels based on the sum of the multiple channels,
    wherein the average gradient vector is calculated based on averaging out the fading and dividing the aggregated gradient vector by a number of UEs in the group of UEs.

18. The method of claim 15, further comprising:
    receiving, from one or more UEs in the group of UEs, an indication that indicates the one or more UEs are not participating in the federated learning procedure; and
    excluding the one or more UEs when calculating the average gradient vector.

19. An apparatus for wireless communication at a user equipment (UE), comprising:
a memory; and
at least one processor coupled to the memory and configured to:
receive a configuration from a network entity that configures a group of UEs to simultaneously transmit one or more group-common reference signals and to simultaneously transmit one or more gradient vectors associated with a federated learning procedure; and
transmit the one or more group-common reference signals and the one or more gradient vectors to the network entity based on the configuration.

20. The apparatus of claim 19, wherein the configuration further configures the group of UEs to transmit the one or more group-common reference signals using a same reference signal sequence.

21. The apparatus of claim 19, wherein the configuration further configures the group of UEs to transmit the one or more gradient vectors after the one or more group-common reference signals and within a defined time period.

22. The apparatus of claim 19, wherein the one or more group-common reference signals and the one or more gradient vectors are transmitted to multiple antennas of the network entity.

23. The apparatus of claim 19, wherein the configuration indicates a time in which the group of UEs are to transmit the one or more group-common reference signals and the one or more gradient vectors.

24. The apparatus of claim 19, wherein the configuration is received via group-common downlink control information (DCI).

25. The apparatus of claim 19, wherein the UE is a participant of the federated learning procedure.

26. The apparatus of claim 19, wherein the at least one processor is further configured to:
transmit an indication to the network entity that indicates the UE is not participating in the federated learning procedure; and
skip transmitting or refrain from transmitting the one or more group-common reference signals and the one or more gradient vectors based on the indication.

27. The apparatus of claim 19, wherein the at least one processor is further configured to:
receive a second configuration from the network entity that configures the group of UEs to transmit the one or more group-common reference signals based on a reference signal pattern specific to the federated learning procedure.

28. The apparatus of claim 19, wherein the at least one processor is further configured to:
receive a training procedure associated with the federated learning procedure from the network entity; and
calculate the one or more gradient vectors based on the training procedure.

29. The apparatus of claim 19, further comprising a transceiver coupled to the at least one processor, wherein the configuration is received via the transceiver.

30. A method of wireless communication at a user equipment (UE), comprising:
receiving a configuration from a network entity that configures a group of UEs to simultaneously transmit one or more group-common reference signals and to simultaneously transmit one or more gradient vectors associated with a federated learning procedure; and
transmitting the one or more group-common reference signals and the one or more gradient vectors to the network entity based on the configuration.

* * * * *